US007634533B2

(12) United States Patent
Rudolph et al.

(10) Patent No.: US 7,634,533 B2
(45) Date of Patent: Dec. 15, 2009

(54) SYSTEMS AND METHODS FOR REAL-TIME AUDIO-VISUAL COMMUNICATION AND DATA COLLABORATION IN A NETWORK CONFERENCE ENVIRONMENT

(75) Inventors: Eric Rudolph, Woodinville, WA (US); Yong Rui, Sammamish, WA (US); Henrique S Malvar, Sammamish, WA (US); Li-Wei He, Bellevue, WA (US); Michael F Cohen, Seattle, WA (US); Ivan Tashev, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 899 days.

(21) Appl. No.: 10/836,778

(22) Filed: Apr. 30, 2004

(65) Prior Publication Data

US 2005/0262201 A1 Nov. 24, 2005

(51) Int. Cl.
*G06F 15/16* (2006.01)
(52) U.S. Cl. ...................................... 709/203
(58) Field of Classification Search ................. 709/204, 709/203
See application file for complete search history.

(56) References Cited

U.S. PATENT DOCUMENTS

| | | | | |
|---|---|---|---|---|
| 5,740,161 | A | * | 4/1998 | Porter et al. ............... 370/260 |
| 6,166,732 | A | | 12/2000 | Mitchell et al. |
| 6,286,034 | B1 | * | 9/2001 | Sato et al. ................... 709/204 |
| 6,321,252 | B1 | | 11/2001 | Bhola et al. |
| 6,532,218 | B1 | | 3/2003 | Shaffer et al. |
| 6,564,246 | B1 | | 5/2003 | Varma et al. |
| 6,584,493 | B1 | | 6/2003 | Butler |
| 6,665,707 | B1 | | 12/2003 | Bates et al. |

(Continued)

FOREIGN PATENT DOCUMENTS

CN 1170315 A 1/1998

(Continued)

OTHER PUBLICATIONS

P. Chiu, A. Kapuskar, L. Wilcox, and S. Reitmeier. Meeting Capture in Media Enriched Conference Room. In Proc. of the 2nd International Workshop on Cooperative Buildings, pp. 79-88, 1999.

(Continued)

*Primary Examiner*—Jeffrey Pwu
*Assistant Examiner*—Farhad Ali
(74) *Attorney, Agent, or Firm*—Lee & Hayes, PLLC

(57) ABSTRACT

Systems and methods are disclosed that facilitate real-time information exchange in a multimedia conferencing environment. Data Client(s) facilitate data collaboration between users and are maintained separately from audio/video (AV) Clients that provide real-time communication functionality. Data Clients can be remotely located with respect to one another and with respect to a server. A remote user Stand-in Device can be provided that comprises a display to present a remote user to local users, a digital automatic pan/tilt/zoom camera to capture imagery in, for example, a conference room and provide real-time information to an AV Client in a remote office, and a microphone array that can similarly provide real-time audio information from the conference room to an AV Client in the remote office. The invention further facilitates file transfer and presentation broadcast between Data Clients in a single location or in a plurality of disparate locations.

38 Claims, 15 Drawing Sheets

U.S. PATENT DOCUMENTS

| | | | |
|---|---|---|---|
| 6,728,784 | B1 | 4/2004 | Mattaway |
| 7,015,954 | B1* | 3/2006 | Foote et al. ............... 348/218.1 |
| 2002/0169831 | A1* | 11/2002 | Lee et al. .................... 709/204 |
| 2002/0191071 | A1 | 12/2002 | Rui et al. |
| 2003/0115263 | A1* | 6/2003 | Tran et al. ................... 709/203 |
| 2003/0135576 | A1 | 7/2003 | Bodin |
| 2003/0224807 | A1 | 12/2003 | Sinha et al. |
| 2003/0236889 | A1 | 12/2003 | Manion et al. |
| 2004/0008423 | A1 | 1/2004 | Driscoll et al. |
| 2004/0034723 | A1 | 2/2004 | Giroti |
| 2004/0128354 | A1* | 7/2004 | Horikiri et al. .............. 709/204 |
| 2005/0033805 | A1 | 2/2005 | Fujiyama et al. |

FOREIGN PATENT DOCUMENTS

| | | |
|---|---|---|
| CN | 1466384 A | 1/2004 |
| EP | 1427144 | 6/2004 |
| JP | 2003085112 A | 3/2003 |
| WO | WO 03/025762 | 3/2003 |
| WO | WO 03026217 | 3/2003 |

OTHER PUBLICATIONS

J. Foote and D. Kimber. FlyCam: Practical Panoramic Video. In Proceedings of IEEE International Conference on Multimedia and Expo, vol. III, pp. 1419-1422, 2000.

Y. Rui, A. Gupta and J.J. Cadiz. Viewing meetings captured by an omni-directional camera. In Proc. ACM CHI'2001, pp. 450-457, Apr. 2001.

Ross Cutler, et al. Distributed Meetings: a Meeting Capture and Broadcasting System. Proceedings of the 10th ACM International Conference on Multimedia, pp. 503-512, 2002.

LiveMeeting. http://www.placeware.com. Last viewed on Jul. 13, 2004. 1 page.

WebEx. http://www.webex.com. Last viewed on Jul. 13, 2004. 1 page.

Tandberg. http://www.tandberg.com. Last viewed on Jul. 13, 2004. 1 page.

PolyCom. http://www.polycom.com. Last viewed on Jul. 13, 2004. 1 page.

H. Richter, et al. Integrating Meeting Capture within a Collaborative Team Environment. In Proc. of the International Conference on Ubiquitous Computing. Ubicomp 2001, LNCS vol. 2201, pp. 123-138, Springer-Verlag, 2001.

EP 05 10 2992, Partial European Search Report, mailed Jul. 28, 2005, 3 pages.

Barton J J, et al. The Meeting Machine: Interactive Workspace Support For Nomadic Users, Oct. 9, 2003, 11 pp., Fifte IEEE Workshop on Mobile Computing Systems and Applications, Piscataway, NJ, USA.

Schmidt, et al. Teleconferencing for the EFDA Laboratories, Sep. 2003, 6 pages, vol. 66-68, Fusion Engineering and Design, Elsevier Science Publishers, Amsterdam, NL.

EP 05 10 2992, Partial European Search Report, mailed Sep. 14, 2005, 8 pages.

Girgensohn, A., et al.; Supporting Group-to-Group Collaboration in Videoconferences; Proceedisng of the 35th Annual Hawaii International Conference Jan. 2001; 9 pages.

Meadows, "Jetsend Protocol—An introduction to the JetSend protocol" eetindia.com, EETimes—India, Jan. 2000.

* cited by examiner

SYSTEMS AND METHODS FOR REAL-TIME AUDIO-VISUAL COMMUNICATION AND DATA COLLABORATION IN A NETWORK CONFERENCE ENVIRONMENT

TECHNICAL FIELD

This invention relates generally to information exchange, and more particularly to real-time multi-media information exchange between remote locations.

BACKGROUND OF THE INVENTION

As computers become faster, smaller, cheaper, and more capable, opportunities for the employment of various technologies to enhance user experiences are on the increase. In conferencing environments, users' computing devices can have widely varied capabilities, which can be problematic when providing information of a specific type to a plurality of users. Conventional systems and methods for conferencing do not explore in depth facilitation of a meeting between distributed participants. Often, information that is presented during a meeting or conference is not adequately documented or preserved for later review, which can further exacerbate problems associated with conference efficiency and information exchange.

There is an unmet need in the art for systems and methods that facilitate improved real-time data collaboration and communication between users in a conference environment.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein relates to real-time information exchange between a plurality of users in a multimedia conferencing environment. The system can provide meeting functionality for users in disparate locations (e.g., a user in a conference room and a user in a remote office), or users located in a single conference room. Various technologies can be employed to facilitate real-time information exchange, comprising, for example, microphone arrays that provide high-fidelity audio, and directional information. The system can also comprise a room camera with digital automatic pan/tilt/zoom framing of persons speaking, and/or automatic warping to equalize people's face sizes, no matter where they sit in the conference room. Additionally, live transmission and snapshot capture of physical whiteboard contents can be facilitated via, for example, a web-camera to preserve and/or disseminate meeting notes displayed thereon. "Capture-and-send" functionality can be provided to permit quick capture and transmission of paper annotations, and furthermore can be provided with tablet PC integration for transmission of ink annotations. This aspect permits transmission of captured documents without requiring printing and faxing, etc. A further aspect of the invention comprises a drag-and-drop interface that enables a user to transfer files between a Data Server database and the user's own hard drive. Additionally, a Presentation Chute can be provided for broadcasting a document, for example, a PowerPoint presentation, etc., to other users attending the conference and receiving Data Client can take appropriate actions with regard to the document based on the document type and other metadata associated with the document. Still furthermore, the invention provides for recording and automatic indexing of meetings, so that the audio content is searchable via various interfaces, such as Outlook and/or SharePoint.

According to an aspect of the invention, a system is provided via which one or more user interfaces (UIs) is presented to a user to facilitate real-time conferencing between at least two participants, which can be physically located in the same conference room and/or in located remotely from each other. The system provides both real-time audio/video communication and real-time data collaboration. A video component can be provided that facilitates both video imagery and still images. Additionally, the video component can automatically warp an image and/or video for presentation to a user. In this manner the system can present a conference room environment to a user in real-time while permitting users to capture and transmit in real-time video and/or still images of, for example, documents, a chalk board, a white board, etc., or any other pertinent piece of information that a first user might desire to share with a second user. The video component can comprise a video camera that captures video of, for example, a conference room and people therein, and a separate web camera that can capture video and/or still images of, for example, a white board containing meeting notes, a paper document, etc. The system also comprises an audio component that provides real-time audio functionality in a conferencing environment. Additionally, a Virtual Director is provided that can coordinate audio and video components to provide an enriched conferencing experience to a user.

According to a related aspect of the invention, a Data Client UI can provide a Presentation Chute to each user to facilitate real-time document sharing and/or presentation viewing. For example, a Presentation Chute icon can be presented via the UI and can permit a user to drag a document (e.g., a photo, a Word file, a PowerPoint presentation, etc.) to the icon, drop the document on the icon, and the system can then upload the document to the Data Server for dissemination to all other data clients attending the virtual conference. For instance, if a presentation document is dropped in the Presentation Chute, such as a PowerPoint presentation, the sender can select to have the presentation automatically begin at another user's UI, or can select to have the Data Server first determine the capabilities of the other user's computer in order to facilitate providing a best mode for the presentation. For example, if the receiving user is attending the virtual conference via a handheld computer, such as a PDA or a cell phone, then the UI presented to that user will have limited capabilities as compared with a laptop, etc. In such a case, the Data Server can wrap a presentation in, for example, PowerPoint Viewer, or any other suitable package to permit the presentation to be viewed by the receiving user despite the relatively limited capabilities of the receiving user's UI. Thus, the system can support two modes of data sharing. For example, data can be sent from one Data Client to another in native format, or, alternatively, data can be formatted appropriately to enable viewing (e.g., not sent as a raw file), to permit a recipient to view the data without editing capabilities.

According to another aspect of the present invention, a Room Server PC is provided that comprises a Room Server that centrally controls components associated with virtual conference. The Room Server PC further comprises a separate Data Server and an AV Server that can be coordinated by the Room Server. All Data Clients in attendance at a virtual meeting are connected to and coordinated by the Data Server. Additionally, an audio-video (AV) client can run on the Room Server PC, and is separate and distinct from a Data Client associated with a virtual conferencing system. The AV Client comprises software that facilitates providing video and/or still images of a conference environment and permits a user to selectively zoom, pan, and/or tilt a digital automatic pan/tilt/zoom (DPTZ) camera located in the conference environment. The AV Client also permits manipulation of audio data, such as noise reduction, gain control to permit amplification of a speaker's voice located further from, for example, a microphone array in the conference environment, as opposed to a speaker located nearer the microphone array, etc. The Data Client can be run on, for example, a laptop, PDA, cell phone, or any other suitable UI for attending a virtual conference, and can be located in the conference room or at a remote location, such as an office in another building, city, country, etc. The Data Client software provides functionality to permit users to share files via a drag-and-drop interface, to broadcast documents via a Presentation Chute, etc. Thus, while both the Data Client and the AV Client are software modules comprising UIs, they can exist as separate entities wherein the AV Client handles capture, transmission, and/or rendering of AV content (e.g., AV communication), and the Data Client handles data collaboration (e.g., file transfer, presentation broadcast, etc.) By separating the AV Client from the Data Client, a user can be permitted to conduct data collaboration without AV communication, to conduct only AV communication without data collaboration (e.g., via employing a cell phone as an audio channel, etc.), and/or concurrently to conduct both data collaboration and AV communication.

According to yet another aspect of the invention, a web camera is provided that facilitates high-resolution digital capture of, for example, documents, white board contents, etc., that a user in a conference room wishes to share with at least one other user in the conference environment. This aspect of the invention permits a hard copy of a document to be transformed into an electronic copy of the document for rapid dissemination and/or for review by at least one user during a virtual conference and/or at a later, more convenient time. This can be particularly useful with respect to white board contents, such as algorithms, sketches, etc., which can be permanently preserved in electronic form for review, thereby mitigating any risk of white board contents being accidentally or inadvertently erased from the board. Images captured by the web camera can be automatically stored at an AV Server and presented, print-ready, to participants in the virtual conference. Furthermore, the web camera can be mobile and can be moved about the conference environment to facilitate capturing a document resting horizontally on a table, a statement on a vertical white board, etc. Additionally, the web camera can be plugged into any computer in the conference environment (e.g., conference room, remote office, etc.) in order to be utilized.

According to still another aspect of the invention, an automatic discovery functionality can be provided by which a user who is approved to attend a virtual meeting can be notified that the meeting is in session, about to start, etc. For example, a user can receive an email notification from a Room Server that the virtual conference is about to start, etc. Additionally, when a user enters a predetermined perimeter associated with the Room Server, the user can be invited to join the virtual conference. User invitations can be selectively predicated on a guest list that can verify user identification via email address, internet protocol (IP) address associated with the user's laptop, PDA, cell phone, etc., or by any other suitable means of identifying a particular user's computing device. Furthermore, virtual conference access can be password-protected to ensure that the user at the computing device is who the user purports to be.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Concepts and Definitions

Figure 1:
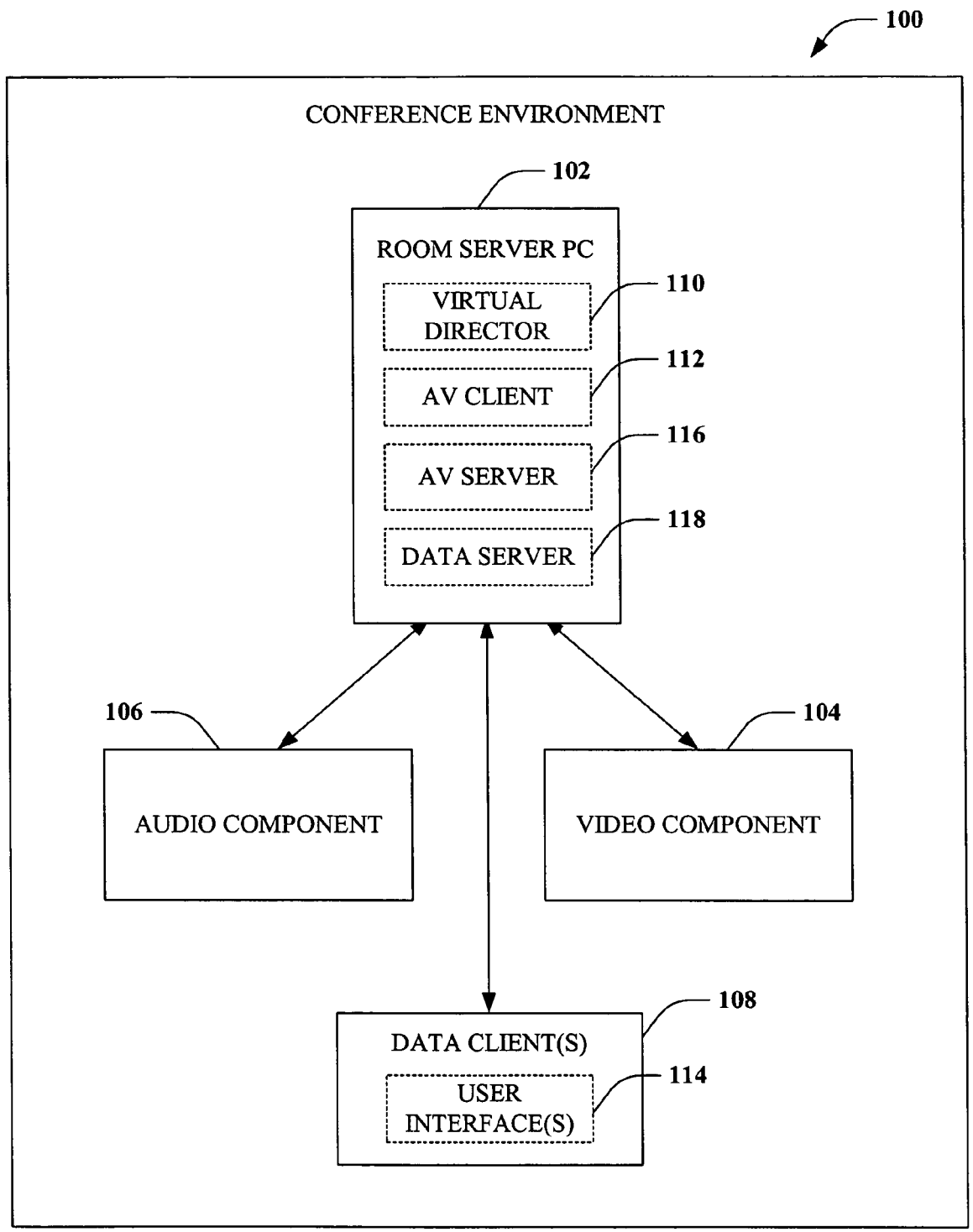
FIG. 1 is an illustration of a system 100 that facilitates real-time information exchange and data collaboration in a multimedia conferencing environment comprising audio/video (AV) clients that permit AV communication and separate Data Clients that provide data collaboration functionality in accordance with an aspect of the present invention.

Software Modules:

Room Server: manages calendars, verifies passwords, coordinates between the Data Server and AV Server.

Data Server: a module that facilitates data sharing between all Data Clients, which are connected thereto; stores server files for a particular meeting.

AV Server: a module that behaves like a multipoint control unit (MCU) and that appropriately mixes multiple in-coming AV streams. The AV Server can determine and/or provide an appropriate output steam, (e.g., video of a single person, frame a plurality of people in a prominent square).

Data Clients: provide a user interface (UI) for a user to perform data sharing, file transfer, etc. All Data Clients are connected via the Data Server.

AV Clients: perform AV communication. All AV Clients are connected via the AV Server. AV Clients and Data Client do not need to communicate with each other, but rather are separate and independent entities.

Data Viewer: activates an appropriate viewer for a document (e.g., photo, PowerPoint presentation (PPT)) that a Data Client receives from another Data Client (e.g., via the Data Server). For example, if the document is MDI, a MDI viewer will be activated. If the document is a PPT, a PPT viewer will be activated.

Local File Region and Server File Region: facilitates transfer of a file (raw bits unchanged) from a local PC to the Data Server, via "drag-and-drop" of the file from a local file region of a UI to a server file region. Any file in the server file region can be drag-and-dropped to any user's local file region. The server file space can be considered a public folder for all meeting participants. Any original file is copied bit-by-bit to facilitate transfer. (See FIG. 7, user interface 700).

Presentation Chute: (See FIG. 7) Permits a user who wants to let other users view a document (e.g., a photo, a word file, a PPT file, etc.) to drag-and-drop the document from the user's local file space to the Presentation Chute. The document is then uploaded to the Data Server, converted to appropriate format, and sent to all the Data Clients. Based on the document format, the Data Client will launch an appropriate Data Viewer. In contrast to file transfer, the Presentation Chute shares only an imaged, non-editable version of the document with others.

Hardware Modules and Configurations:

Room Server PC: runs the Room Server, Data Server and AV Server. Normally, it also runs the conference room AV Client.

Stand-in Device: (See FIG. 8) Comprises a monitor, speakers, a microphone array, and a wide-angle camera. The Room Server normally connects to this Stand-in Device. Raw video of most of the conference room is captured by the wide-angle cam, as shown in FIG. 9 (902).

Web Camera: facilitates image capture of physical whiteboard/document. The web cam can be connected to any PC/laptop/etc that runs a Data Client, regardless of whether the computing device is in the conf room or in a remote location.

Exemplary Configuration:

In the conference room, users normally bring their laptop/tablet or other appropriate computing devices. While the Room Server PC runs the Room Server, Data Server, AV Server, and an AV Client, laptops/tablets, etc., in the conference room run Data Clients to allow respective users to participate (data collaboration) in a meeting. Note that because the Room Server PC already displays an AV Client on its monitor (part of the Stand-in Device), users in the conference room do not need to run AV Clients on their individual laptops. Note further that it is not required for people to bring laptops to the conference room. In such a case, a user who desires to conduct data collaboration can utilize another user's laptop or run a Data Client on the Room Server PC. However, ideally each user will have his or her own laptop to conduct data collaboration with greater ease and efficiency during the meeting.

Users in remote offices can choose to run only an AV Client, only a Data Client, or both an AV Client and a Data Client on their desktop PC, laptop and/or other computing device(s). If remote users desire to be seen and/or heard by other users, a web cam and/or microphone can be provided on the remote users' PCs. Remote offices can comprises one or a plurality of users in a single office, and remote offices can be one or more in number. In the case where a remote office comprises a plurality of remote users, the remote office can be similar, but inferior, to a conference room.

Additionally, there can be a plurality of conference rooms, each of which has its own Room Server PC and Stand-in Device. In one exemplary configuration, only one of the conference rooms needs to be selected as the main conference room, where its Room Server PC runs each of a Room Server, a Data Server and an AV Server. In such a case, other Room Server PCs need only to run an AV Client. According to another exemplary configuration, every Room Server PC runs its own Room Server, Data Server, AV Server and AV Client.

The present invention is not intended to be limited by the foregoing description of software and hardware modules and configurations thereof, as some modules may, in conjunction with aspects of the present invention, be optional to the function of the present invention. For example, a minimum configuration can comprise a Room Server PC (running a Room Server and a Data Server) and two Data Clients. Addition of other software and/or hardware components facilitates enriching users' conferencing experience.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 is an illustration of a system 100 that facilitates real-time information exchange in a multimedia conferencing environment in accordance with an aspect of the present invention. The system 100 comprises a Room Server PC 102 that comprises a central Room Server (not shown) to coordinate communication and collaboration in a virtual conference environment. The Room Server PC 102 is operatively coupled to a video component 104 and an audio component 106 that can monitor a conference environment such as a conference room, a business office, a home office, etc. The particular environment being monitored can comprise one or a plurality of users, each of whom can engage in data collaboration via a Data Client 108. The Room Server PC 102 comprises a Virtual Director 110 that facilitates real-time control over the video component 104 and the audio component 106 and fulfills user requests, and an audio-video (AV) client 112 comprising software that provides AV functionality to users in attendance at the virtual conference, located in the conference room. The Virtual Director is operably coupled to the AV Client in the Room Server PC 102

Additionally, the Room Server PC 102 comprises an AV Server 116 that coordinates information exchange and/or AV communication between AV Clients, for example, wherein a remote user attends a virtual conference via a remote PC running its own AV Client. Similarly, the Room Server PC 102 comprises a Data Server 118 that coordinates information exchange and data collaboration between Data Clients 108, whether running on a remote PC or on a local PC present in the conference room. It is to be appreciated that a Data Client can be run on the Room Server PC 102 in addition to the AV Client 112, but is not required to be run thereon. The Room Server residing on the Room Server PC 102 can provide, for example, calendar management, password verification, and coordination between the AV Server 116 and the Data Server 118. By providing a Room Server that manages both the AV Server 116 and the Data Server 118, no direct communication is necessary there between, which in turn permits the AV Server 116 to exist as a separate and distinct entity from the Data Server 118.

All Data Clients 108 connect to the Data Server 118, regardless of whether a given Data Client 108 is run on a remote PC or on a local PC. An AV Client running on the Room Server PC 102 is connected to the AV Server 116 in the Room Server PC 102. A remote user can launch an additional AV Client from a remote PC, and such a remote AV Client will also be connected to the AV Server 116 in the Room Server PC 102. In this manner, the AV Server 116 is similar to a multipoint control unit that permits incoming AV streams from a plurality of AV Clients to be appropriately mixed.

The video component 104 can capture images as video and/or as still images, which permits a video conference to proceed while providing functionality to capture images of, for example, a document, a white board, etc. For example, a wide-angle web camera such as a digital automatic pan/tilt/zoom (DPTZ) camera can capture video of a conference room and persons present therein while a separate mobile web camera can capture, for example, video of a white board in real time as the white board is being populated during a meeting, still images of documents and/or a populated white board for later review, etc. Such dual functionality of the video component permits users to proceed with a conference conducted in a single location and/or between remote locations (e.g., a conference room in Seattle and a remote office in London) while providing images of documents, white boards, etc., that can be reviewed at a later time. Additionally, the video component is operable to provide an auto-warping functionality, by which the relative proximity of a plurality of attendees in, for example, a conference room, can be equalized to provide a remote user with a better view of more distant attendees as compared with those attendees closer to the video component in a conference room.

Both the video component 104 and the audio component 106 are communicatively coupled to the AV client 112 and the Virtual Director 110, which can exert control over the video component 104 and the audio component 106. For example, information from the audio component 106 can be employed to locate a position of a current speaker in the conferencing environment. Such position information can be employed by the Virtual Director 110 to direct the video component 104 to capture video, images, frames, etc. of the person speaking at the location derived from the audio information. For example, the video component 104 can comprise a digital video camera that can zoom to a speaker based on information indicative of speaker position.

The Virtual Director 110 can employ various rules of cinematography, etc., such as limiting the frequency with which the video component 104 is permitted to switch views between, for example, two people speaking back and forth to each other in a conference room. In this case, the two speakers can be presented side-by-side, etc. Additionally, a remote user can be granted authority to override the Virtual Director 110 at any time, thereby selecting any view the remote user desires.

The audio component 106 can provide high-fidelity sound capture capability to enhance a conferencing experience. The audio component 106 can be configured in an array of microphones in order to ensure that a speaker's voice will be well-received from any point in the conferencing environment. Such an arrangement can further facilitate noise reduction, acoustic echo cancellation (AEC), and automatic gain control (AGC), all of which can contribute to overall noise reduction by several tens of decibels. The audio component 106 further comprises audio healing capabilities that can mitigate quality deficits detected at a receiving point that arise from, for example, jitters and/or variable delays in a network configuration, to provide a glitch-free audio signal and enhance users' conferencing experience.

The Room Server PC 102 is further operatively coupled to at least one Data Client 108 that receives information from the Room Server PC 102 via the Data Server 118. Additionally, the Data Client 108 can comprise a user interface (UI) 114 that facilitates presentation to a user of information received from the Data Server 118. The Data Client can be running on, for example a laptop, a handheld computing device, a PDA, a cell phone, or any other suitable device that can receive information from the Data Server 118 and present such information in a meaningful manner to a user participating in the conference. The Data Client 108 of the system 100 is separate and distinct from the AV Client 112 in order to facilitate centralized AV control at the AV Server 116 so that local users in attendance at a virtual conference can simultaneously receive AV-related data without individual AV Clients. This aspect of the invention streamlines the system 100 by reducing the number of system components required to provide an enriched virtual conferencing environment. However, it is to be appreciated that individual PCs running Data Clients 108 can additionally comprise an AV Client 112 if a user so desires.

Figure 2:
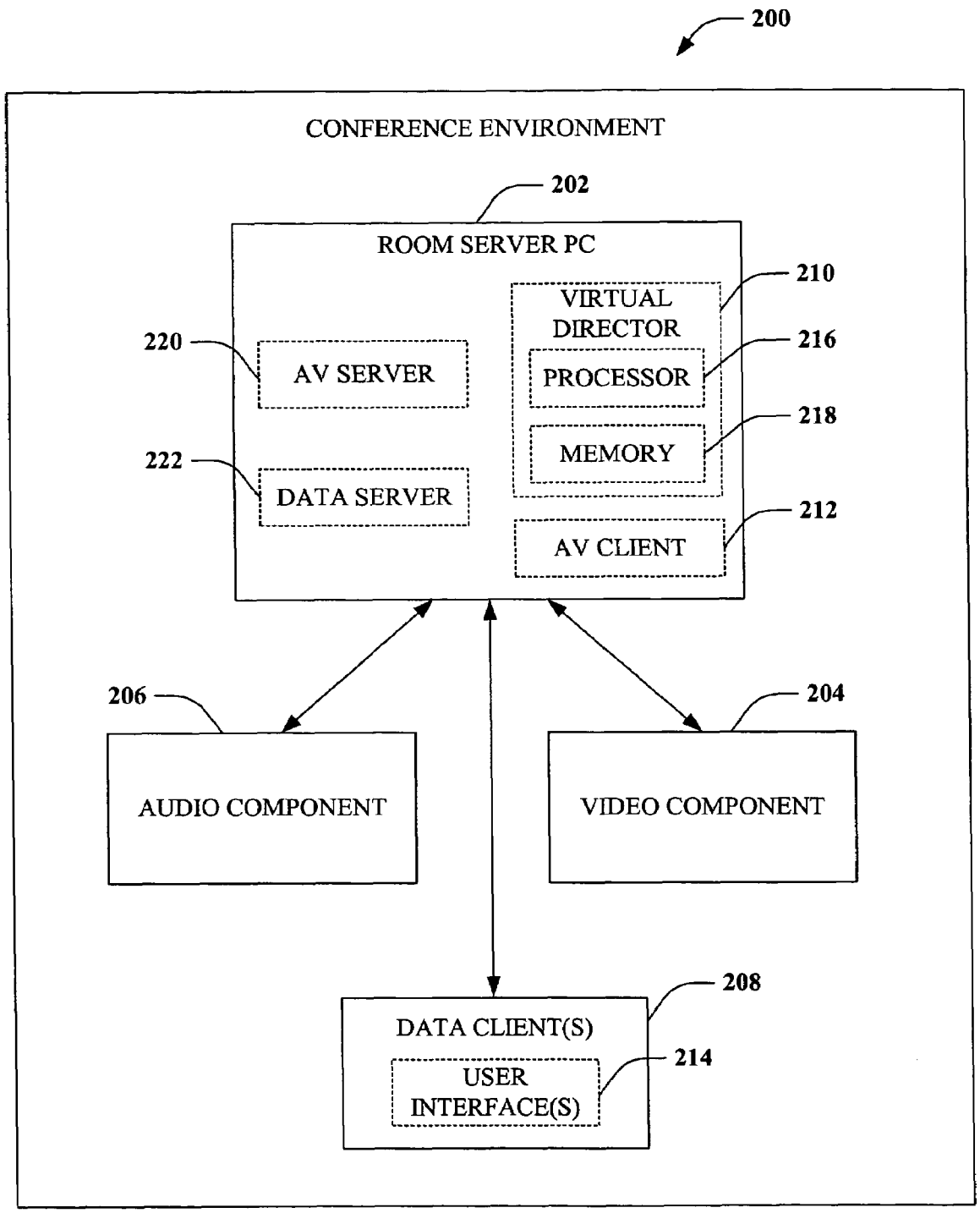
FIG. 2 is an illustration of a system 200 that comprises a processor and memory to facilitate real-time information exchange and data collaboration in a multimedia conferencing environment in accordance with an aspect of the present invention.

FIG. 2 is an illustration of a system 200 that facilitates real-time information exchange in a multimedia conferencing environment in accordance with an aspect of the present invention. The system 200 comprises a Room Server PC 202 that provides centralized server functionality via a Room Server (not shown) and is operatively associated with each of a video component 204, and audio component 206, and at least one Data Client 208. The Room Server PC 202 comprises a Virtual Director 210 that imparts control functionality to the Room Server PC 202 over aspects of a virtual conferencing environment, and an AV Client 212 that provides software applications to facilitate transmission, and Virtual Director 210 and/or user control of, audio and video information. Such information can be presented to a user via a user interface (not shown) associated with the AV Client 212.

The Virtual Director 210 is further associated with a processor 216 that analyzes, and a memory 218 that stores, information associated with various aspects of the conference environment. It is to be appreciated that the processor 216 can be a processor dedicated to processing information related to the conference environment, a processor that controls one or more components of the real-time multimedia conferencing system 200, or a processor that both processes information related to the conference environment and controls one or more components of the real-time multimedia conferencing system 200. Additionally, although the processor 216 and memory 218 are illustrated as being associated with the Virtual Director 210, it is to be appreciated that a plurality of processors 216 and/or memories 218 can exist in other components described herein, and that the processor 216 and memory 218 are not limited to association only with the Virtual Director 210.

Furthermore, in reference to the memory component 218, it will be appreciated that the memory (e.g., data store) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory of the present systems and methods is intended to comprise, without being limited to, these and any other suitable types of memory.

The Room Server PC 202 further comprises an AV Server 220 that coordinates AV communication between the AV Client 212 in the Room Server PC 202 and, for example, a remote AV Client (not shown) launched by a remote user on a remote PC. Additionally, the Room Server PC 202 comprises a Data Server 222 that coordinates data collaboration between Data Clients 208, whether running on a remote PC or on a local PC present in the conference room. It is to be appreciated that a Data Client 208 can be run on the Room Server PC 202 in addition to the AV Client 212, but is not required to be run thereon.

Figure 3:
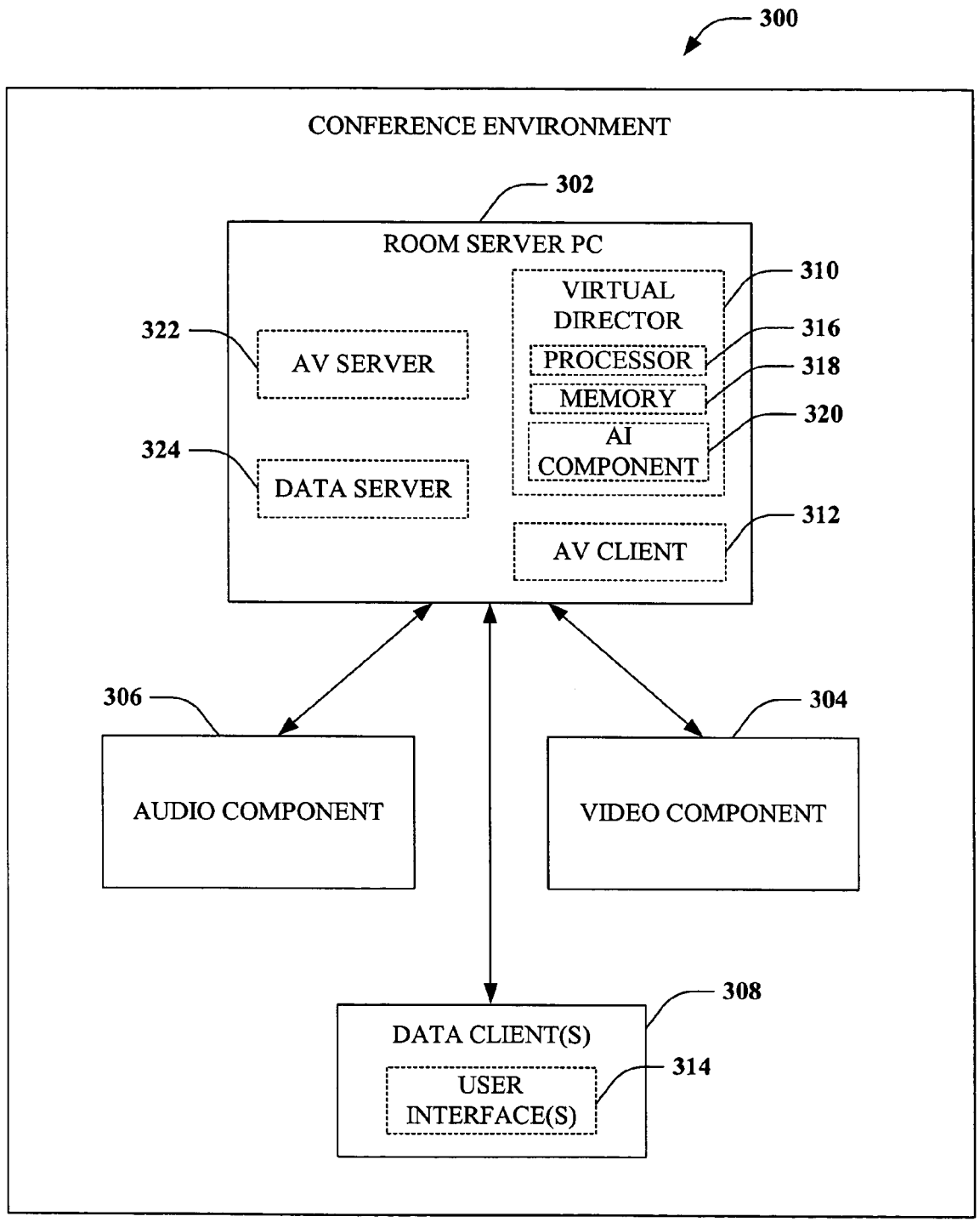
FIG. 3 is an illustration of a system 300 that comprises an artificial intelligence component that makes inferences to facilitate real-time information exchange and data collaboration in a multimedia conferencing environment in accordance with an aspect of the present invention.

Now turning to FIG. 3, as used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Still referring to FIG. 3 illustrates a system 300 that facilitates real-time multimedia information sharing in a conference environment in accordance with an aspect of the present invention. According to the figure, the system 300 comprises a Room Server PC 302 that is operatively coupled to each of a video component 304, an audio component 306, and at least one Data Client 308. The Room Server PC 302 comprises a Virtual Director 310 that provides control functionality to the Room Server PC 302 over aspects of a virtual conferencing environment, and an AV Client 312 that provides software applications to facilitate transmission, and system and/or user control of, audio and/or video information. Such information can be presented to a user via a user interface (not shown) associated with the AV Client 312.

The Virtual Director 310 is associated with a processor 316 and a memory 318 that respectively analyze and store information associated with the conference environment. Additionally, the Virtual Director 310 comprises an artificial intelligence component 320 that can make inferences regarding, for example, the presentation of information to a user. According to another example, a user can attend a virtual conference via launching, for example, a Data Client 308, an AV Client 312, or both, on a computing device in a location remote from the Room Server PC 302 and the conference room in which the Room Server PC 302 is located. To further this example, a user in a disparate locale who desires AV communication with a conference environment can launch a remote AV Client from, for instance, a cellular phone. However, the cellular phone is not likely to have the graphical capabilities of, for instance, a laptop or a PC, and could potentially be overloaded with information received from an AV Server 322 on the Room Server PC 302. The AI component 320 can make inferences regarding, for example, the graphical capabilities, download rate, etc., of the remote user's cell phone and can package and/or transmit conference related data to the cell phone in an appropriate manner to facilitate presenting the information to the remote user without exceeding the limitations of a user interface on the cell phone. It is to be appreciated that the foregoing examples are intended for illustrative purposes, and are not intended to limit the number of inferences that can be made by the described system or the manner in which such inferences are made.

In addition to the Virtual Director 310 and the AV Client 312, the Room Server PC 302 can comprise an AV Server 322 that coordinates AV communication between the local AV Client 312 in the Room Server PC 302 and, for example, a remote AV Client (not shown) launched by a remote user on a remote PC, and/or between two or more remotely running AV Clients. Additionally, the Room Server PC 302 can comprise a Data Server 324 that coordinates data collaboration between Data Clients 308, whether running on a remote PC or on a local PC present in the conference room. It is to be appreciated that a Data Client can be run on the Room Server PC 302 in addition to the AV Client 312, but is not required to be run thereon.

Figure 4:
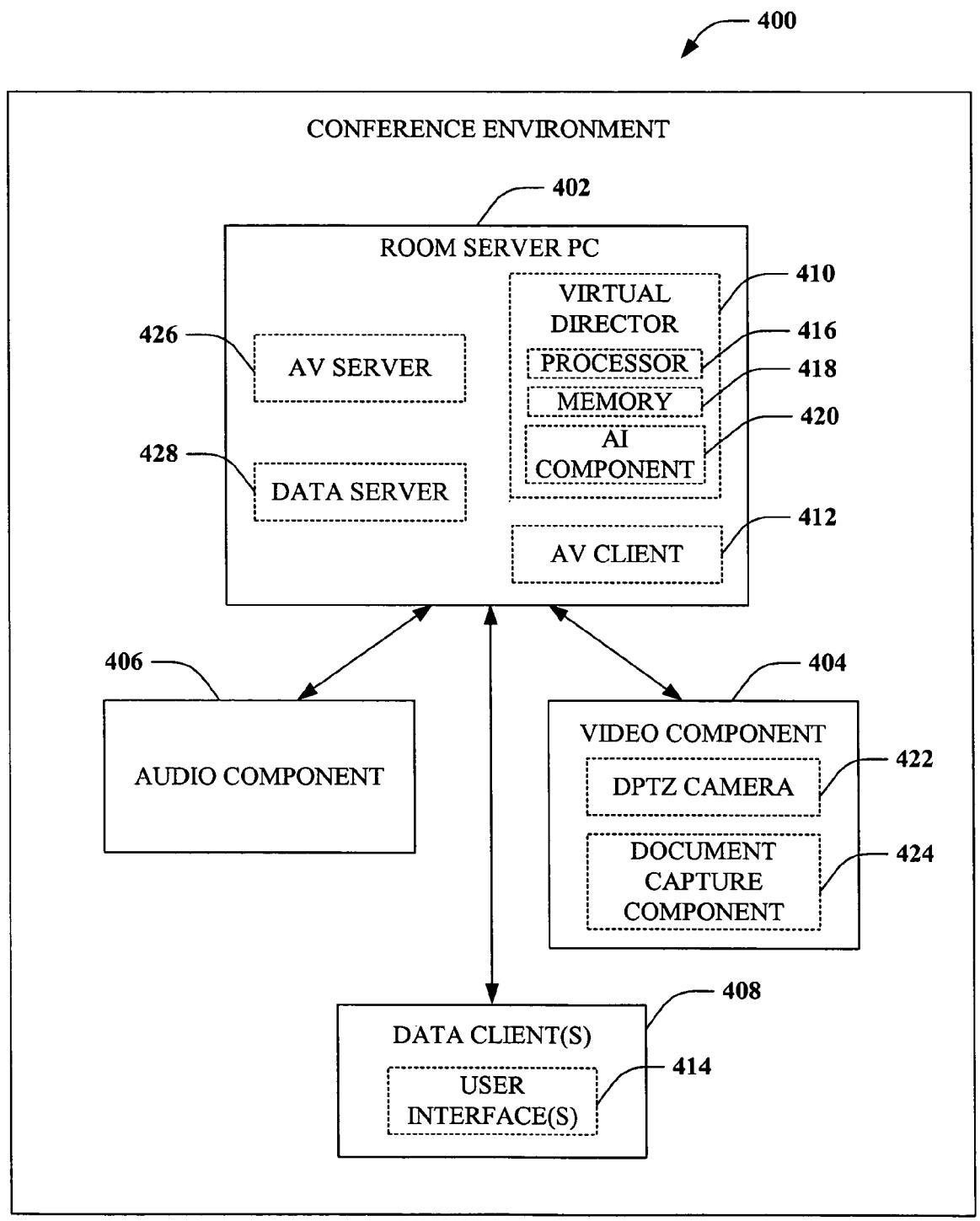
FIG. 4 is an illustration of a system 400 that facilitates real-time information exchange via employing a digital automatic pan/tilt/zoom camera and/or a web camera in a multimedia conferencing environment in accordance with an aspect of the present invention.

FIG. 4 is an illustration of a system 400 that facilitates real-time information exchange in a multimedia conferencing environment in accordance with an aspect of the present invention. A Room Server PC 402 is operably coupled to a video component 404 that can glean visual information from the conferencing environment,. The Room Server PC 402 is further operatively associated with an audio component 406 that monitors the conference environment and to gather data related to sounds therein. The Room Server PC is still further operatively coupled to at least one Data Client 408 that facilitates data collaboration between itself and a Data Server 428 residing in the Room Server PC 402 in the conference environment and presents information to a user via a UI 414. As described with respect to previous aspects and figures, the Room Server PC 402 comprises a Virtual Director 410 and an AV Client 412 with a UI (not shown). The Virtual Director 410 additionally is associated with a processor 416 that analyzes data associated with the conference environment, a memory component 418, and an AI component 420 that makes inferences regarding information exchange in the conference environment.

According to this aspect of the present invention, the video component 404 can comprise a digital automatic pan/tilt/zoom (DPTZ) camera 422 that can provide real-time video information of a conference room in which it is located. The Virtual Director 410 can direct the DPTZ camera 422 to frame a person speaking at a given moment in the conference room and such imagery can be received by the an AV Server 428 residing in the Room Server PC 402 and disseminated in real time via the UI associated with the AV Client 412. For example, transmitting a video of a conference room at high-resolution requires a significant amount of information to be sent. The Virtual Director can mitigate large transmissions by presenting a speaking person in high resolution while presenting the rest of an image of the conference room in low resolution. By transmitting the majority of an image in low resolution, the size of a transmission can be significantly reduced. Additionally, the DPTZ camera 422 can provide an automatic warp functionality whereby the size of each attendee present in the conference room can be equalized despite the relative distance of each attendee from the DPTZ camera 422. This particular aspect of the invention will be discussed in further detail infra.

The video component 404 can further comprise a document capture component 424, such as a web camera, that permits hard copies of documents to be transformed into electronic copies that can be presented in real time to each user. For example, the document capture component can take a still image of a paper document, a white board containing meeting notes, etc., and preserve such documents electronically for subsequent review, etc. Furthermore, once captured, documents can be instantly disseminated to users in a ready-to-print format.

Figure 5:
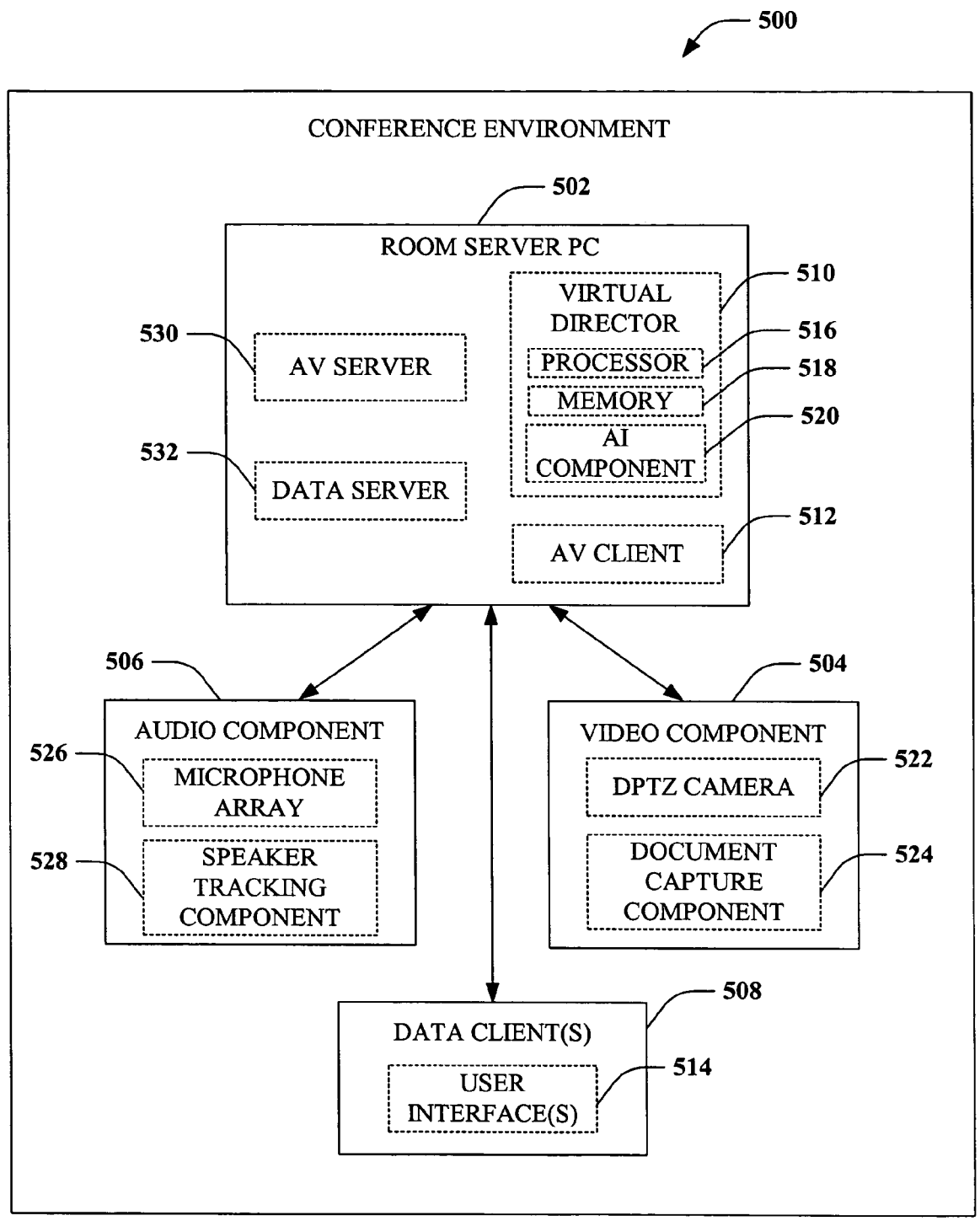
FIG. 5 is an illustration of a system 500 that facilitates real-time information exchange via a microphone array in a multimedia conferencing environment in accordance with an aspect of the present invention.

FIG. 5 illustrates a system 500 that facilitates real-time multimedia information exchange in a conferencing environment in accordance with an aspect of the present invention. A Room Server PC 502 is operably coupled to a video component 504 that monitors a conference room environment to capture video data associate with, for example a conference, and an audio component 506 that monitors a conference room to glean audio information related thereto. The Room Server PC 502 is further operatively associated with a Data Client 508 that provides data collaboration functionality and can present information received from a Room Server (not shown) on the Room Server PC 502 to a user via a user interface 514.

The Room Server PC 502 comprises a Virtual Director 510 that facilitates automated control of AV information dissemination and/or collection, and an AV Client 512 that provides software applications, programs, processes, threads, etc., to facilitate receipt and/or dissemination of information in audio and/or video format(s). It is to be noted that the AV Client 512 is separate and distinct from the Data Client 508, which facilitates mitigating a need for a separate AV Client at each local user's personal computing device. The Virtual Director 510 is associated with a processor 516 that facilitates control of various components of the system 500 and/or analyzes information received there from. The Virtual Director 510 is further associated with a memory 518 that can store information received from system components and/or analyzed by the processor 518. Additionally, the Virtual Director 510 comprises an AI component 520 that can make inferences regarding, for example, information dissemination to at least one user etc.

The video component 504 comprises a DPTZ camera that can monitor, for example, a conference room environment. Individual remote users can selectively zoom, pan, tilt, etc., to different regions of a real-time image presented to the remote user via respective AV Clients 512 launched on remote users' computing devices. This aspect of the invention can be especially useful to a user attending a conference from a location disparate to the physical location of the Room Server PC 502 in a conference room. The video component 504 further comprises a document capture component 524 that can capture images of documents, such as, for example, a hard copy of a memo, meeting notes on a white board, or any other document that a user desires to preserve in electronic form and/or share with remote users. Such images can be immediately presented to all users, such that upon capturing an image, the image immediately appears to the user and is ready to print if the user desires.

The audio component 506 comprises a microphone array 526 and a speaker tracking component 528. Although the speaker tracking component 528 is illustrated as being comprised by the audio component 506, it is to be appreciated the speaker tracking component 528 can be comprised by the an AV Client 512 and/or the Virtual Director 510, and is not limited to the physical orientation in which it is illustrated in FIG. 5. The microphone array 526 can provide high-fidelity, noise-free capture of audio information. Furthermore, the microphone array can provide directional information that can be analyzed, for example, to determine the location of a person who is speaking in a conference room via the speaker tracking component.

Additionally, vision-based tracking can be facilitated by, for example, the Virtual Director 510 based at least in part on data received from the video component 504 (e.g., a wide-angle web camera, DZPT camera, etc.) Such can be particularly useful in scenarios comprising a large volume environment noise, such as applause, and room reflection, wherein the accuracy of a microphone array can be compromised. Video captured by the wide-angle room camera can be employed by a vision-based tracking algorithm (e.g., motion-based, appearance-based, particle filter based approaches, etc.). Furthermore, directional information from the microphone array and vision-based tracking results can be fused by, for example, a particle filter (not shown) (or other appropriate machine-learning technique(s)) associated with the Virtual Director 510, to produce more accurate and robust tracking results than either of the microphone array directional information or vision-based tracking information alone.

The Room Server PC 502 further comprises an AV Server 530 that coordinates AV communication between the AV Client 512 in the Room Server PC 502 and, for example, a remote AV Client (not shown) launched by a remote user on a remote PC. Additionally, the Room Server PC 502 comprises a Data Server 532 that coordinates data collaboration between two or more Data Clients 508, whether running on a remote PC or on a local PC present in the conference room. It is to be appreciated that a Data Client 508 can be run on the Room Server PC 502 in addition to the AV Client 512, but is not required to be run thereon.

Figure 6:
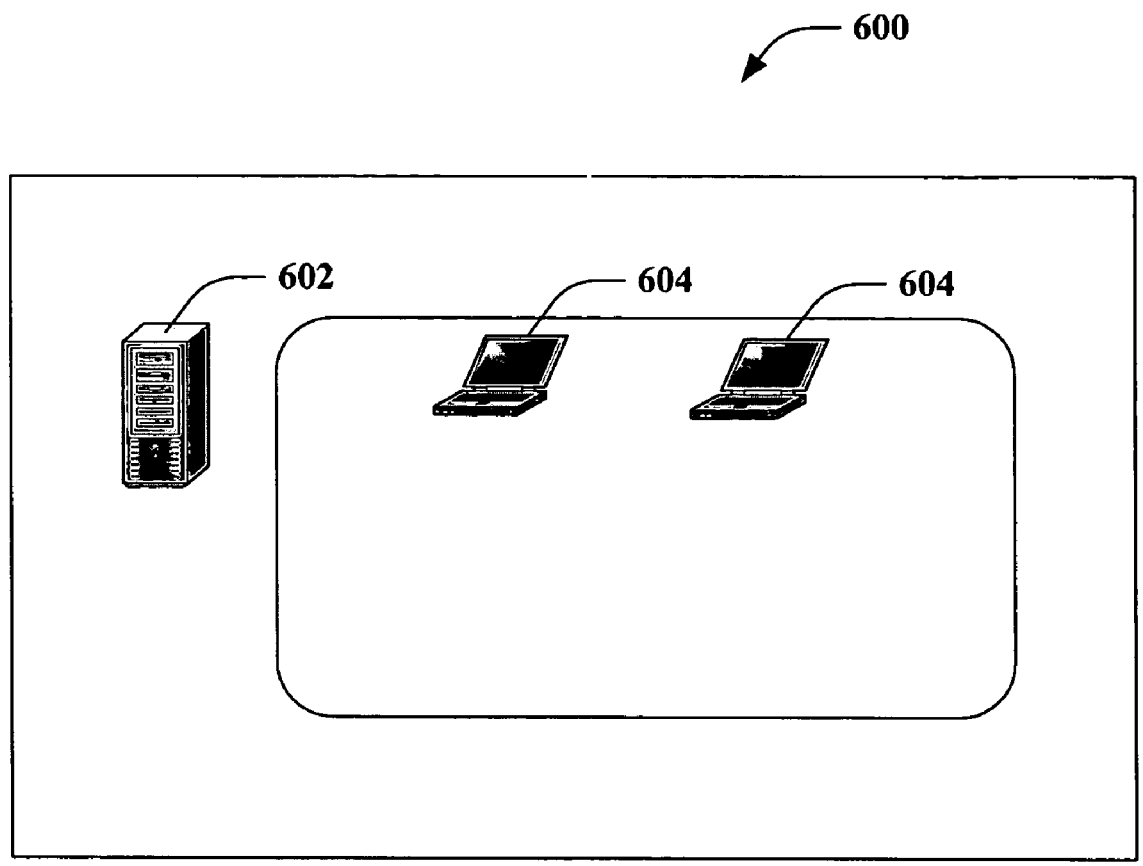
FIG. 6 is an illustration of a system 600 comprising a Room Server and at least two Data Clients to facilitate data collaboration in a multimedia conferencing environment in accordance with an aspect of the present invention.

FIG. 6 is an illustration of a basic conferencing environment 600 in accordance with an aspect of the present invention. According to the figure, the conferencing environment 600 comprises a Room Server PC 602 and at least two Data Clients 604, which can reside on users' computing devices, such as laptops, tablet PCs, and the like. Optionally, a Data Client 604 can reside on the Room Server PC 602.

Each Data Client 604, illustrated as a laptop in FIG. 6, provides data collaboration capability to a user. According to an aspect of the invention, a user who enters the conference room with a Data Client 604, running on a laptop a tablet PC, etc., can be identified by the a Room Server residing on the Room Server PC 602 and invited to join the conference. For example, the user can be identified via an IP address associated with the Data Client 604, an email address associated with the Data Client 604 and/or user, a unique universal resource locator (URL) ID generated by the Room Server for each meeting, etc. Furthermore, the user can be prompted to enter a password to verify that the user of the Data Client 604 is actually the person who the user purports to be (e.g., a person who is invited to the conference, meeting, etc.).

The Room Server PC 602 can comprise and govern a Data Server that facilitates data collaboration between Data Clients 604. For example, each Data Client 604 comprises drag-and-drop file transfer capabilities, such that a user can drag files between "local" and "server" regions presented to a user as part of a user interface (UI) associated with each Data Client 604, and the file immediately will be copied from the Data Client 604 to the Data Server in Room Server PC 602, and vice-versa. Once a file is copied to the Data Server in the Room Server PC, all attendees at the meeting have complete access to the file. The file can be document, such as a word processing document, a spreadsheet, or any other suitable file capable of being created, transferred, stored, etc.

A related aspect of the invention provides for drag-and-drop file broadcast capabilities via a "Presentation Chute" presented to a user as part of a user interface (UI) associated with each Data Client 604. According to this aspect, a presentation file, such as, for example, a PowerPoint presentation, can be dragged over and released upon the Presentation Chute. Once placed in the chute, the presentation can be immediately presented via the Data Server in the Room Server PC 602 to other Data Clients 604 in attendance at the meeting, regardless of whether the other Data Clients 604 are remote or local. Additionally, the sender of the presentation can have increased control over the presentation as compared to the amount of control granted to recipients of the document. For example, if a first user transmits a presentation to a second user, the first user can require that the presentation slides can only be advanced upon the first user's prompt (e.g., a mouse-click, stylus tap, voice prompt, . . . ). Alternatively, the first user can "unlock" presentation control and permit other users to advance the presentation at will. According to this example, a plurality of recipient users can view the presentation at different rates, according to their individual needs. The Presentation Chute will be discussed in greater detail infra, with regard to FIG. 7.

Figure 7:
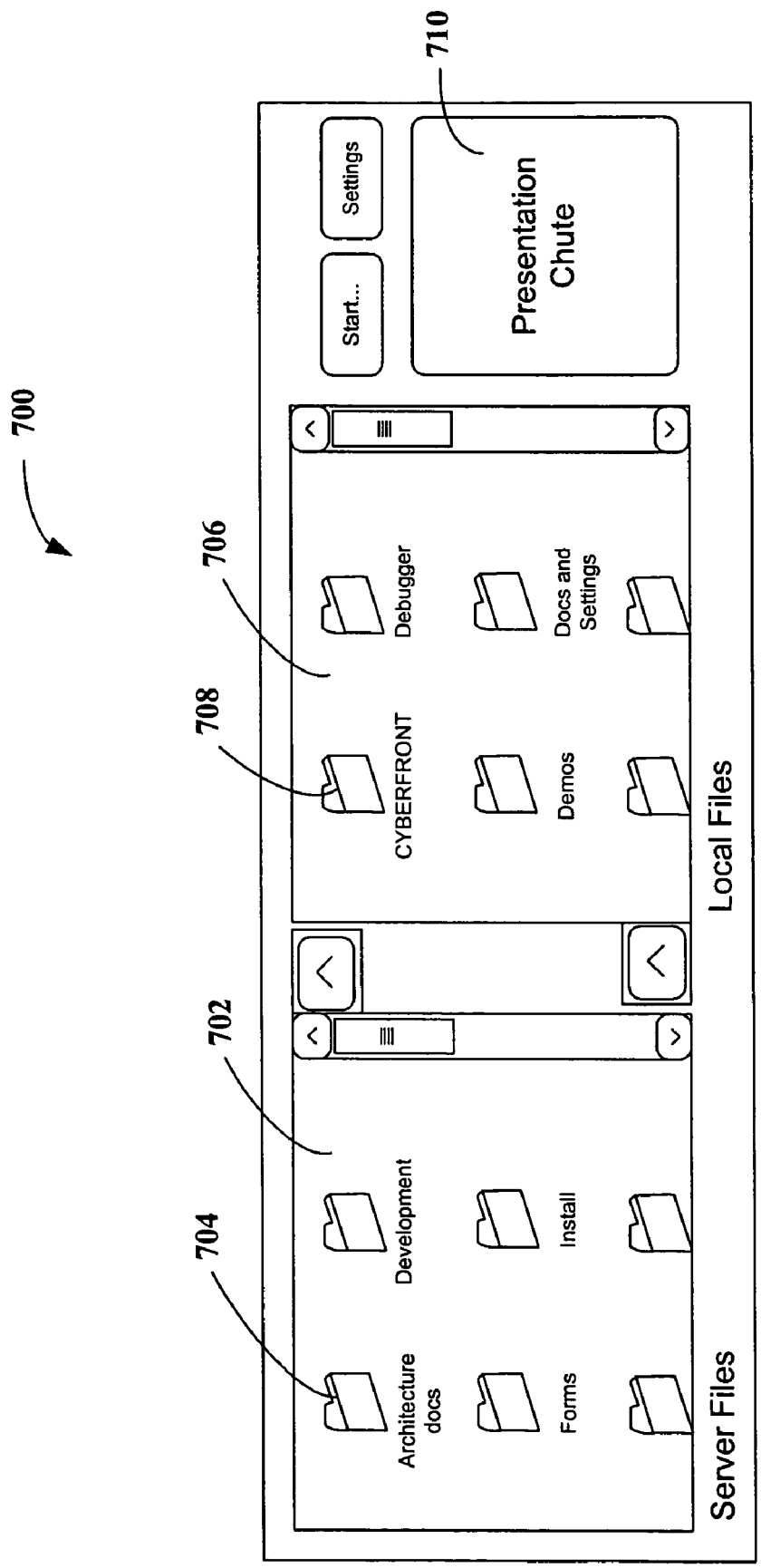
FIG. 7 is an illustration of an exemplary user interface 700 that facilitates real-time information exchange and data collaboration in a multimedia conferencing environment in accordance with an aspect of the present invention.

FIG. 7 illustrates an exemplary UI 700 that can be presented to a user via a Data Client. The UI 700 comprises a "server files" region 702 that comprises server file icons 704 representing files stored on a Room Server in a conference room. The UI 700 further comprises a "local files" region 706 that comprises local file icons 708 representative of files stored locally on a Data Client on which the UI 700 is presented to a user. Thus, while the server file icons 704 in the server files region 702 will be the same for each Data Client attending a conference, the local file icons 708 in the local files region 706 can vary from one Data Client to the next, although it is possible that two or more Data Clients will have the same set of local files represented as local file icons 708 in the local file region 706 of the UI 700. A user can drag an icon 708 from the local file region 706 and release it in the server file region 702 to cause the local file to be uploaded to the server, permitting other users to receive and/or access the file in their respective server file regions 702. Additionally, a user can drag-and-drop a server file icon 704 on the local file region 706 to copy the server file to the user's local hard drive.

The UI 700 comprises a Presentation Chute 710 that facilitates presentation sharing between Data Clients. For example a can drag a presentation file (e.g., an electronic slide presentation, PowerPoint presentation, etc.) over the Presentation Chute 710 and release it thereon for upload to the Data Server. Transmission to the Data Server can be accompanied by sound effects to notify the user that upload is in progress. The Data Server can then initiate a file broadcast to other Data Clients attending a meeting. Each Data Client can then individually launch an appropriate Data Viewer to show the presentation. The user who initially places the presentation file in the Presentation Chute 710 can be considered the owner of the presentation, and can control scrolling operations (e.g., previous, next, etc.) during the presentation. Alternatively, the owner can permit desynchronization among users at receiving Data Clients, such that receiving users can be permitted to skip ahead, revert to previous slides, and generally view the presentation at their own paces. In this case, each UI can provide a "Sync" icon (not shown) that, when clicked on, will automatically synchronize the presentation on the receiving Data Client to the owner's view of the presentation. Additionally, the owner's Data Client can have a master "Sync" icon (not shown) that will synchronize all Data Client views to the owner's view when activated.

Figure 8:
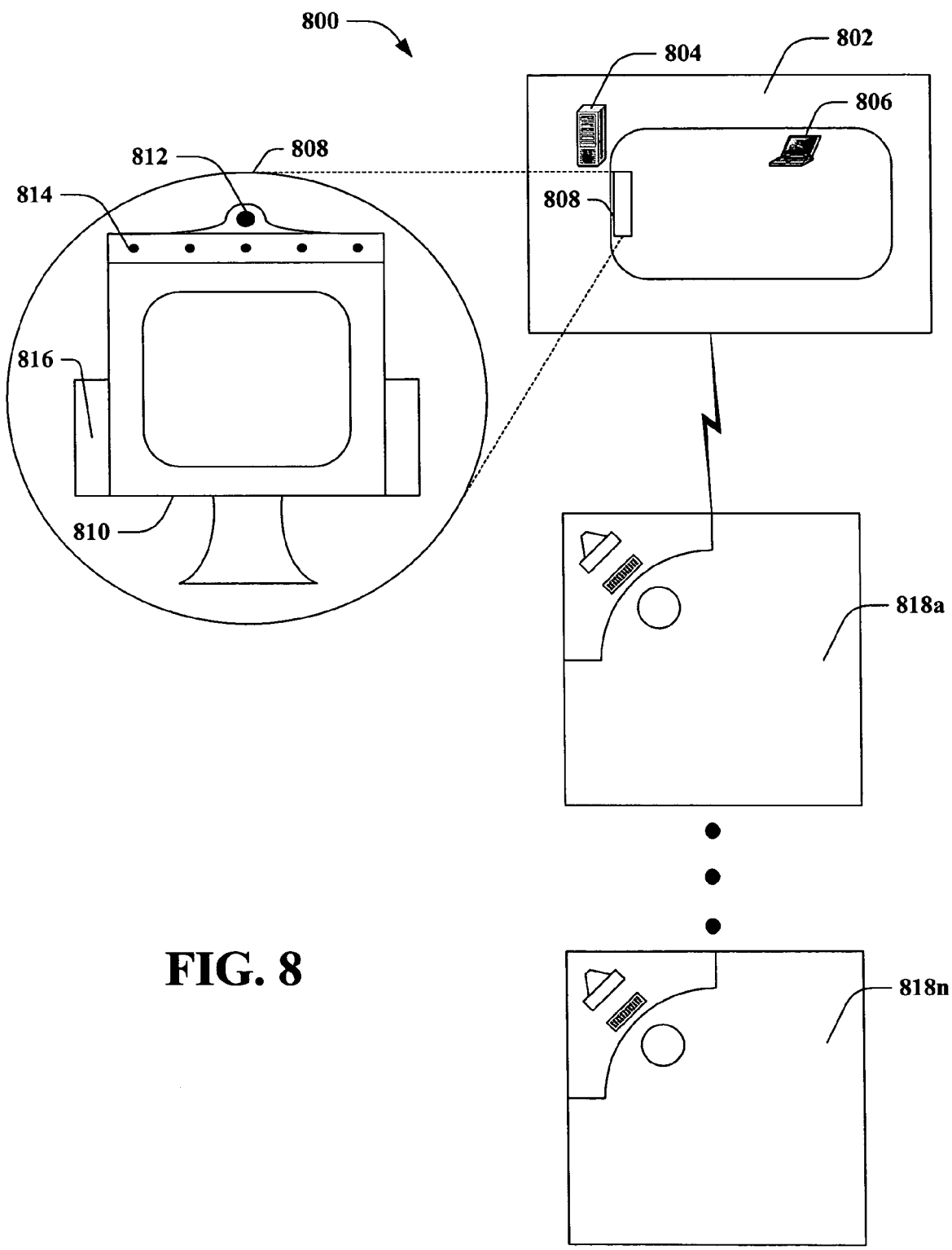
FIG. 8 is an illustration of a multimedia conferencing environment 800 that facilitates real-time information exchange and data collaboration comprising a remote Stand-in Device that provides an interface at least one remotely located conference site, in accordance with an aspect of the present invention.
Figure 9:
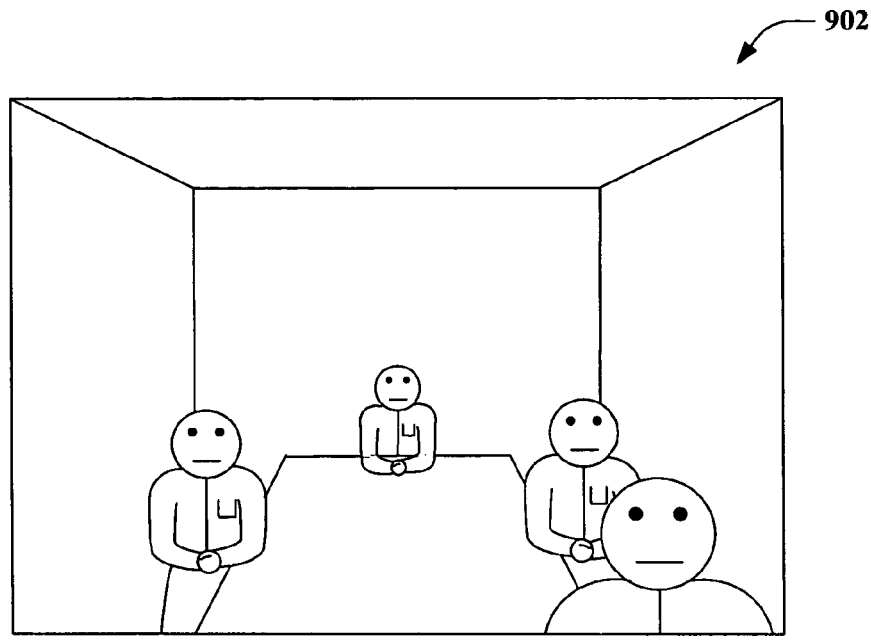
FIG. 9 is an illustration of a exemplary warped video images such as can be presented via a user interface associated with an AV Client to facilitate real-time AV information exchange in a multimedia conferencing environment in accordance with an aspect of the present invention.
Figure 9:
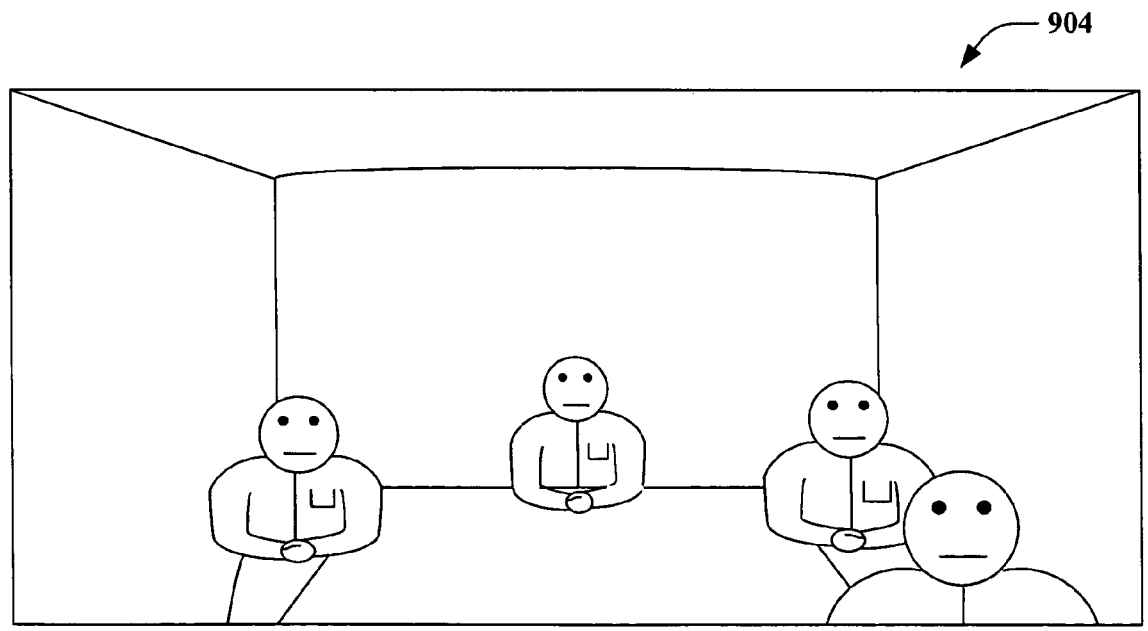

Turning now to FIG. 8, a conference environment 800 is illustrated in accordance with an aspect of the present invention. According to the figure, the conference environment 800 comprises a conference room 802 with a Room Server PC 804. The conference room 802 further comprises at least one Data Client 806, residing in for example a laptop, a tablet PC, a handheld computing device, or any other device suitable to present a user interface to a user in conjunction with aspects of the present invention set forth herein. The conference room 802 further comprises a remote user Stand-in Device 808 that facilitates presenting a remote user in near-life size to users located in the conference room and vice versa. The Stand-in Device 808 comprises a display 810 (e.g., a monitor, a flat panel display, . . . ), upon which are mounted a DPTZ camera 812, a microphone array 814, and speakers 816. It is to be appreciated that there can be one or a plurality of remote Stand-in Devices depending on the number of remote users attending a meeting. Additionally, a single remote Stand-in Device can be employed to represent multiple remote users (e.g., via a split-screen, picture-in-picture technology, etc.) The Stand-in Device 808 is operatively coupled to the Room Server PC 802.

The DPTZ camera 812 captures images of the conference room and people therein and such information is received by a local AV Client in communication with an AV Server in the Room Server PC 804, for presentation to a remote user via an AV Client running on the remote user's PC. The DPTZ camera 812 can automatically warp images of the conference room so that attendees located therein are presented at roughly the same size, despite an individual's actual distance from the DPTZ camera 812, as is described in more detail with respect to FIG. 9. Automatic warping facilitates allowing a remote user (or, e.g., a Virtual Director, as described with reference to FIGS. 1-5), to zoom into any person, including those situated far from the DPTZ camera 812.

The microphone array 814 captures sound from the conference room, such as a speaker's voice, and provides information associated therewith to the AV Client in the Room Server PC 804 for presentation to the remote user. Additionally, the microphone array 814 can provide position information related to a speaker's position, for example, to a Virtual Director in the Room Server PC 804, which can employ the position information to direct the DPTZ camera 812 to zoom to the position of the speaker. Such zooming can additionally be performed by a remote user according to a related aspect of the invention.

Additionally, vision-based tracking can be facilitated by the Virtual Director based on data received from the DPTZ camera 812. Video captured by the DPTZ camera 812 can be employed by a vision-based tracking algorithm (e.g., motion-based, appearance-based, particle filter based approaches, etc.) to determine speaker location. Furthermore, directional information from the microphone array and vision-based tracking information from the DPTZ camera 812 can be fused together by a particle filter (or other appropriate machine-learning technique(s)) to produce more accurate and robust tracking results than either of the microphone array directional information or vision-based tracking information alone.

According to a further aspect of the invention, a speaker can be presented to the remote user in high resolution in addition to a low resolution video of the conference room, such that when a speaker begins to speak, position information received by the AV Client (e.g., microphone array directional information and/or vision-based tracking information) in the Room Server PC 804 is used by the Virtual Director to determine the location of the speaker within the conference room, and the DPTZ camera 812 is directed to present that location in high resolution in addition to a low resolution video of the conference room. By permitting the resolution of the image to be reduced, bandwidth constraints can be mitigated when present. The microphone array 814 can be supported by a real-time communication audio stack, and can provide automatic echo cancellation, sound source localization, noise suppression (e.g. of localized noise source(s)), and/or gain control to facilitate audibility with respect to distant speakers.

The speaker(s) 816 are provided in conjunction with the Stand-in Device 808 to present audio information to users in the conference room from the remote location. In this manner, the remote user can speak to attendees in the conference room from the remote office 818a-818n. Each remote user has a computer that can comprise its own AV Client to facilitate reception of AV-related information from the conference room. Additionally, the remote user's computer can comprise a Data Client that facilitates data collaboration between the remote Data Client and the Data Server in the Room Server PC 804 and/or Data Client(s) 806 in the conference room. Each remote office 818a-818n can be equipped with a microphone (not shown) and a web camera (not shown) to capture AV information in the remote office for transmission via an AV Client running in the remote office to the AV Server in the Room Server PC 804 and presentation on the remote Stand-in Device 808.

It is to be appreciated that the remote user can employ, for example, a cellular phone as a UI if necessary, and can view the conference room via the wide-angle digital video camera on the remote Stand-in Device if the cellular phone has video functionality. However, the cellular phone can be utilized to provide audio functionality at a minimum, such that the remote user can hear and be heard in the conference room 802. The remote user in this scenario can be notified of the initiation of the meeting by, for example, a call to the cellular phone placed by the server 804, by another attendee at the meeting, etc. Additionally, the remote user in this example will only launch an AV Client, as no Data Client is desired by the remote user.

FIG. 9 is an exemplary illustration of an image presented on a user interface associated with an AV Client of a conference room before and after automatic warping by the AV Client, Virtual Director, etc. As illustrated, the first image 902 depicts a conference room in which four attendees sit at various distances from a DPTZ camera. The attendee at the end of the table is perceived at an exaggerated distance compared to other attendees to the conference. After warping, the image 904 of the conference room presents all attendees in a more equalized arrangement, such that the relative distances of the attendees from the DPTZ camera is still perceivable, but each individual attendee is presented as having a size relatively equal to every other attendee. Thus, the image 904 more closely resembles the view that would be perceived by a person physically present in the room.

Automatic warping operates by identifying a different magnification power to be applied to each vertical scanline in an unwarped image. For example, in most cases the center of the image is expanded more while the sides may not be enlarged. The magnification varies smoothly across the image, thus minimizing distortion in any local area. This results a wider but more uniform view of the conference room as opposed to a view with wide-angle distortion. The automatic warping of conference room images facilitates an enriched conferencing experience for the remote user(s).

Figure 10:
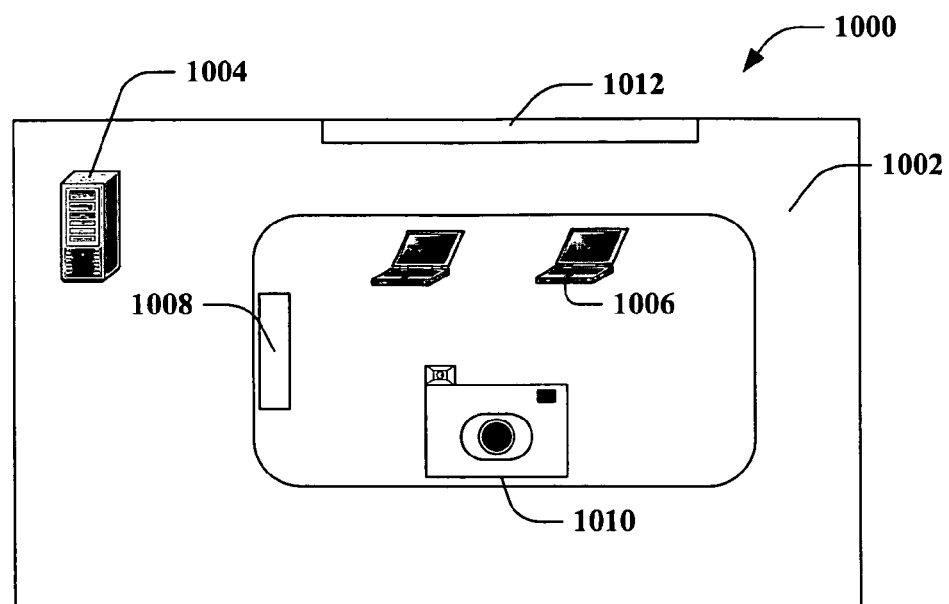
FIG. 10 is an illustration of a multimedia conferencing environment 1000 that facilitates real-time information exchange and data collaboration in a comprising at least one sufficiently equipped conference room and at least one remotely located conference site, in accordance with an aspect of the present invention.
Figure 10:
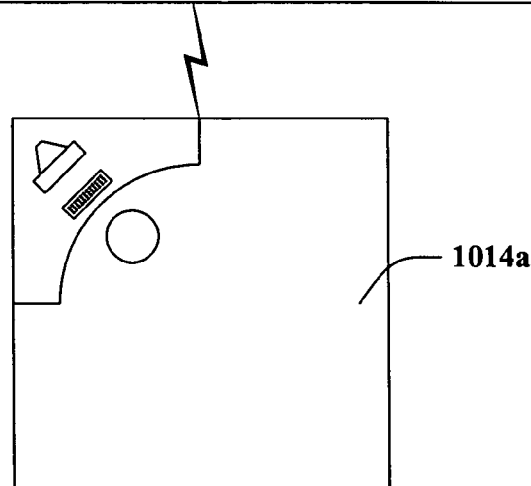
Figure 10:
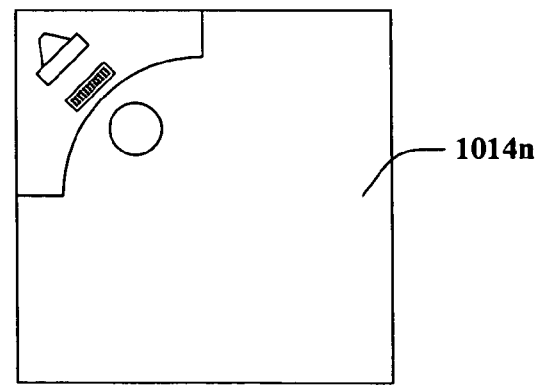

FIG. 10 illustrates a conferencing environment 1000 similar to that described in FIG. 6, in accordance with an aspect of the present invention. The conference environment 1000 comprises a conference room 1002 with a Room Server PC 1004 comprising a Room Server that facilitates centralized control over a Data Server and an AV Server, and at least one Data Client 1006. A Stand-in Device 1008 is illustrated that represents a remote user in a remote office 1014a-n as described with respect to FIG. 8, where the Stand-in Device comprises the features and functionalities described therein. It is to be appreciated, however, that the presently described conference environment 1000 can comprise two or more Data Clients 1006 located in the conference room without a remote user.

The conference environment 1000 further comprises a high-resolution web camera 1010 that facilitates capturing images of, for example, a paper document (not shown) and/or a white board 1012. As used herein, "document" is intended to comprise a document, sketch, etc., written on a white board. The web camera 1010 can be directed at, for example, the white board 1012, and images captured thereby can be presented to all users via user interfaces associated with AV Clients running in each location, whether in the conference room 1002 or in a remote office 1014a-n. Such imagery can be presented in real time, which facilitates real-time updates to the white board such that erasures, additions, and/or any other changes to the white board can be perceived by remote user(s) as well as to users physically present in the conference room 1002. Additionally, the web camera 1010 can capture still images, such that if no further changes will be made to the white board content, a still image of the white board 1012 can be captured and presented by an AV Client running in the location of the white board to an AV Server in the Room Server PC 1004 for dissemination to AV Client(s) local to other users for storage and/or later review.

It is to be appreciated that the present invention is not limited in application to a single conference room 1002, but rather can facilitate real-time multimedia information exchange between any number of disparately located conference rooms and/or offices, regardless of geographical location and/or proximity to one another. The single primary conference room 1002 is presented herein for purposes of illustration only and is not intended to limited number of conference locations, rooms, offices, etc., in and/or between which the present invention can operate. Additionally, a web camera can be provided in any remote office, secondary conference site, etc., to facilitate document and/or white board image capture at the remote location for presentation to other AV Clients.

Furthermore, a physical document can be digitally photographed by the web camera 1010 and immediately transmitted to AV Client(s) via an AV Server for user review, printing, signature, etc. Such a "capture-and-send" protocol can comprise image capture of a document and/or whiteboard, enhancement of the image, and immediate transmission. For example, a remote user who receives a captured image of a document requiring the remote user's signature can print the document, sign it, and employ a second web camera (not shown) at the remote location to capture an image of the signed document and immediately transmit the image back to the original sender of the document. The original sender can then print the signed document, store it electronically, etc. If a signing user is employing a tablet PC to run the AV Client, then the signing user can sign electronically utilizing a tablet stylus, without having to print the document and/or employ a second web camera before retransmitting the signed document.

Example Scenario

To illustrate the operation of the above-described system(s), the following example is proffered. The following exemplifies a potential usage scenario with respect to the systems and methods disclosed herein, but is exemplary in nature and not intended to limit the scope of the present invention, as other potential usage scenarios are contemplated and intended to fall within the scope and spirit of the present invention. User1, User2, and User3 are having a status meeting. User1 and User2 are in a conference room as described herein while User3 attends from his office remotely. In the conference room, there is a Room Server PC, a high-resolution web camera, and a remote person Stand-in Device. User1 brings a tablet PC and User2 brings a laptop to the conference room. User1 and User2 see User3 on the Stand-in Device and User3 sees User1 and User2 on his desktop display. User3 hears clear audio from User1 and User2; he can see them both in a panorama window and a larger view of the User who is currently speaking. User1 and User2 see a clear, near-life-size video of User3, and can also hear him clearly. AV Clients are running on the Room Server and on User3's office PC. Data Clients are running on User1's tablet, User2's laptop and User3's office PC.

User2 has edited a word document right before the meeting and desires to share it at the meeting. User2 drag-and-drops the new document into the Presentation Chute displayed to User2. Within seconds, the document shows up in User1 and User3's Data Clients.

User1 drag-and-drops a PowerPoint file into the Presentation Chute of his Data Client. An appropriate Data Viewer is launched with the PowerPoint presentation on User2 and User3's computers. User3 can skip slides and browse ahead to quickly see the presentation contents, and can then press a "sync" button to synchronize the presentation back to User1's current slide.

User3 draws a block diagram on his office white board, and points a high-resolution web camera toward the white board. When User3 clicks on a "Start . . . whiteboard" icon, the white board content is sent to the server, and appears on User1's and User2's laptops. White board content can be presented in real time: if User3 erases a block, it disappears from User1's and User2's views also. User1 can annotate on the white board image with his tablet, and those annotations can be saved if the meeting is recorded.

Toward the end of the meeting, User3 desires a signature from User2 approving a decision made during the meeting. User3 drag-and-drops a form from the Local Files region of his Data Client interface to the Server Files region. User2 receives the form right away, prints it out on the nearest printer, and signs it. User2 plugs the high-resolution web camera into her laptop, points the camera to the signed form, and clicks on "Start . . . (capture-and-send)" icon(s) in her Data Client. User3 receives the "fax" almost immediately. If User1 's signature is needed as well, he can sign electronically with his Tablet pen.

While, for purposes of simplicity of explanation, the one or more methodologies shown herein, e.g., in the form of a flow chart, are shown and described as a series of acts, it is to be understood and appreciated that the present invention is not limited by the order of acts, as some acts can, in accordance with the present invention, occur in a different order and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the present invention.

Figure 11:
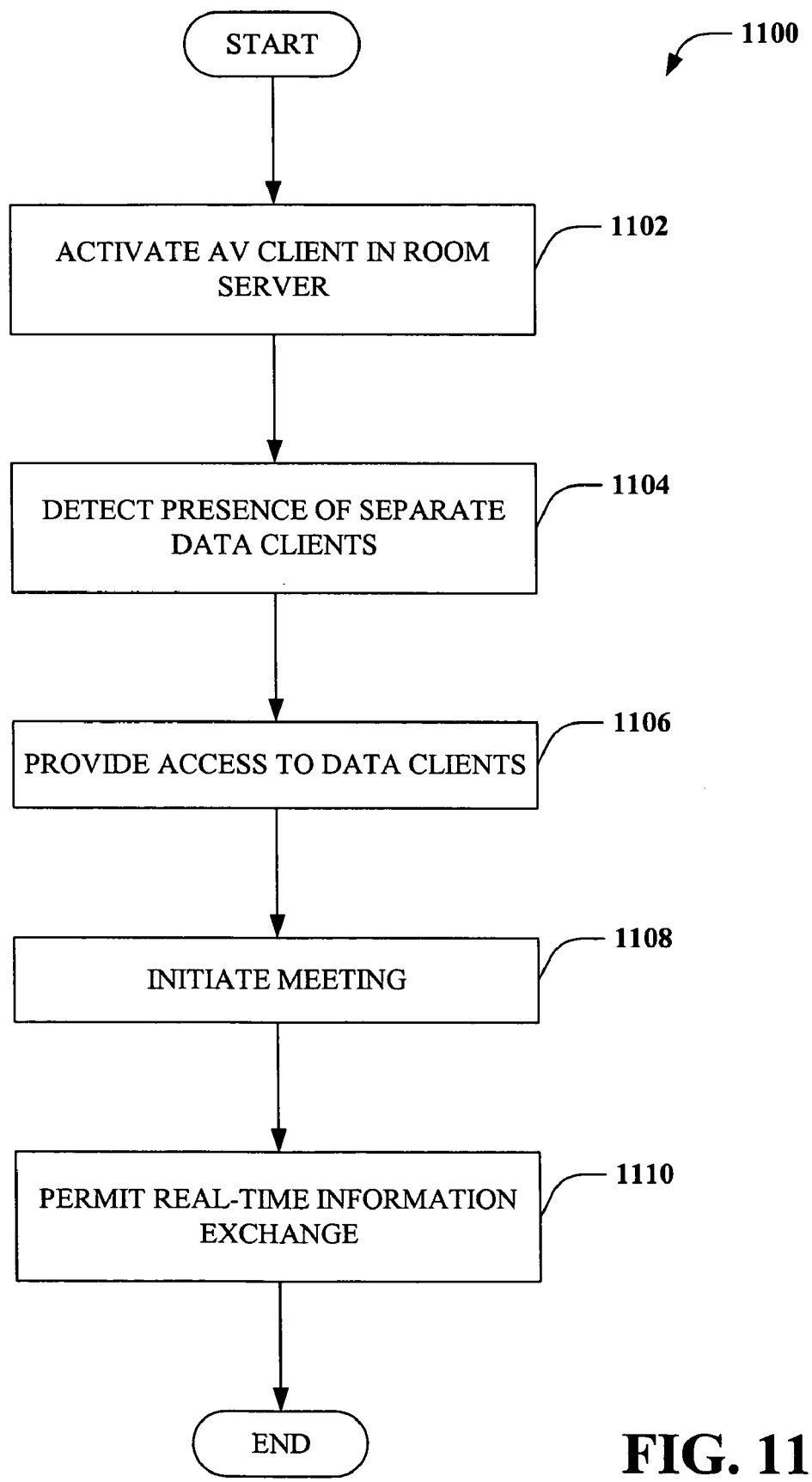
FIG. 11 is an illustration of a methodology 1100 for providing real-time information exchange in a multimedia conferencing environment and permitting users to attend a conference in accordance with an aspect of the present invention.

FIG. 11 is an illustration of a methodology 1100 in accordance with an aspect of the present invention. At 1102, a Room Server activates an AV Client to facilitate real-time multimedia information exchange in a conferencing environment. AV Client activation can occur in two manners. For example, a remote AV Client can connect to an AV Server controlled by the Room Server on which a local AV Client resides, prompting the Room Server to launch the local AV Client. Additionally, the local AV Client can initiate a connection to a remote AV Client via an AV Server, for example, at a predetermined meeting time, etc. It is to be appreciated that while the software comprising the AV Client resides on the Room Server, and while the Room Server can also launch and/or run Data Client software, the Data Client and the AV Client are separate and distinct software modules. Accordingly, it is possible for the Room Server to run an AV Client without running a Data Client and vice-versa.

At 1104, the Room Server directs a Data Server to search for and identify any Data Clients that are or can be logged in to the conference. Each Data Client that has authority to participate in the conference is permitted to log in at 1106, and such login can be password protected. Upon logging in of at least two Data Clients, a meeting can be initiated at 1108, in which users of the at least two Data Clients can exchange information in real time via respective Data Clients and can be presented with AV information from the AV Client running on the AV Server at 1110. It is to be appreciated that the at least two Data Clients need not be located in the same location, but rather a Data Client can attend the meeting from a remote office. In such a scenario, the remote Data Client will typically be run on the remote user's office computer, and a separate AV Client can be launched to provide the remote user with AV data from the conference room while the remote Data Client facilitates data collaboration between itself and other Data Clients and/or the Data Server in a Room Server PC in the conference room.

Figure 12:
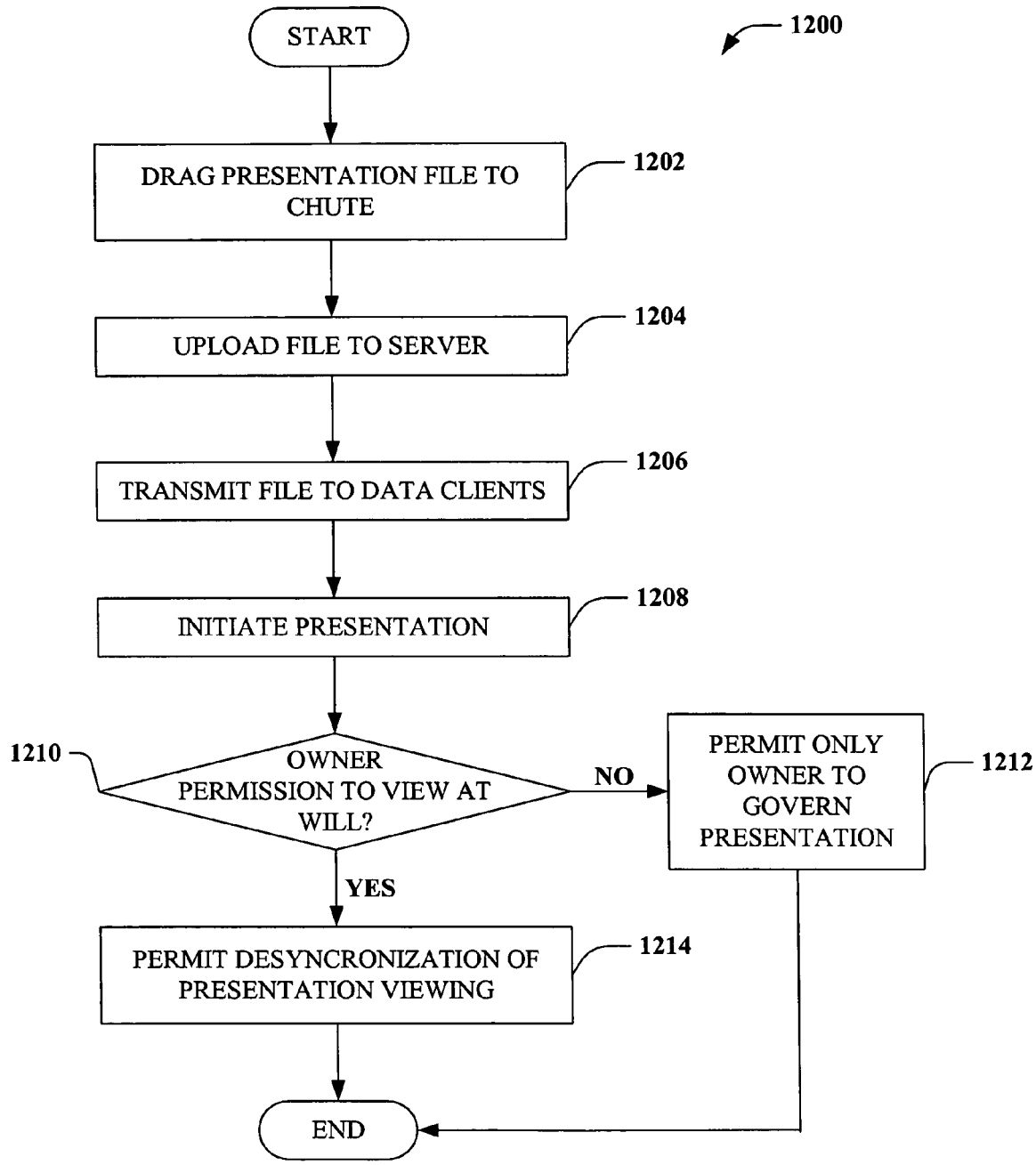
FIG. 12 is an illustration of a methodology 1200 for providing real-time information exchange in a multimedia conferencing environment and facilitating presentation sharing in accordance with an aspect of the present invention.

FIG. 12 is an illustration of a methodology 1200 for near-instant document viewing in a conference environment in accordance with an aspect of the present invention. According to the figure, at 1202, a user of a Data Client can drag a presentation (e.g., an electronic slide presentation, etc.) to a Presentation Chute icon on the user interface (UI) presented to the user by the Data Client. The user can drop the presentation on the icon, and the presentation will be uploaded to a Data Server at 1204. The presentation can be transmitted to each Data Client as an image version of the presentation at 1206. At 1208, a determination is made regarding whether the owner (e.g., sender, originator, . . . ) has given permission to enable recipient Data Client users to view the presentation at will, or whether the owner has locked the presentation so that only the owner can advance the presentation. If the owner has not granted permission to the recipient Data Client users to view the presentation at will, then control over the presentation will remain with the owner at 1210. If, however, the owner has granted such permission, then at 1212, desynchronization of the presentation can be permitted so that recipients can scroll through the presentation, for example, to peruse contents thereof, while the owner of the presentation continues therewith at a different pace. Resynchronization can occur at any time a recipient wishes to return to the owner's presentation pace.

Figure 13:
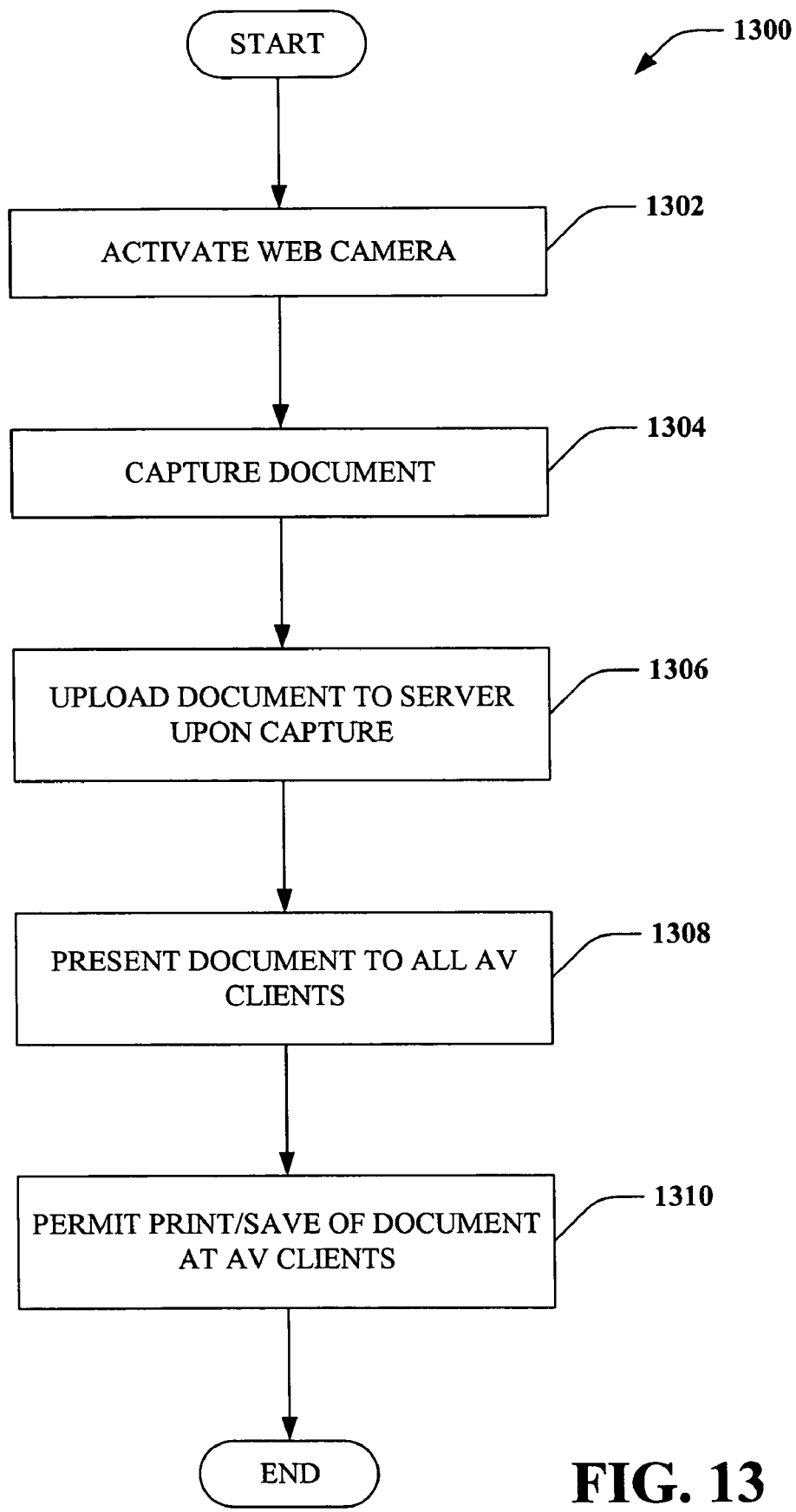
FIG. 13 is an illustration of a methodology 1300 for providing real-time information exchange in a multimedia conferencing environment and facilitating real-time document capture in accordance with an aspect of the present invention.

FIG. 13 is an illustration of a methodology 1300 that facilitates real-time document capture in a multimedia conferencing environment in accordance with an aspect of the present invention. It is to be understood that "document," as used herein, can be a physical paper document, sketches and/or notes on a white board in a conference room and/or office, etc. At 1302, a high-resolution web camera can be activated. At 1304, document images can be captured. Images can be captured as real-time video, such as white board contents. Images of the whiteboard can undergo a "white-balancing" protocol, via which such images can be processed, cleaned, sharpened, etc., to improve a user's viewing experience, and can then be presented to users in real time. In this manner, changing white board contents (e.g., altered by additions, erasures, etc.) can be seen by users as they happen. Users can additionally be permitted to save such images at any time for later review. Additionally, images can be captured as still images, such as an image of a paper document that requires a signature. Such still images can be presented to users to be printed for ink signature, electronically signed, signed with a tablet stylus, etc.

At 1306, captured documents can be uploaded to an AV Server via an AV Client local to the web camera for distribution to other AV Clients at 1308. Once received, users running respective AV Clients can view, print, save, etc., captured images for manipulation, later review, etc., at 1310. In this manner, the present invention can facilitate an instant capture-and-send functionality that mitigates time-consuming tasks associated with traditional facsimile procedures and enhances a user's conferencing experience.

Figure 14:
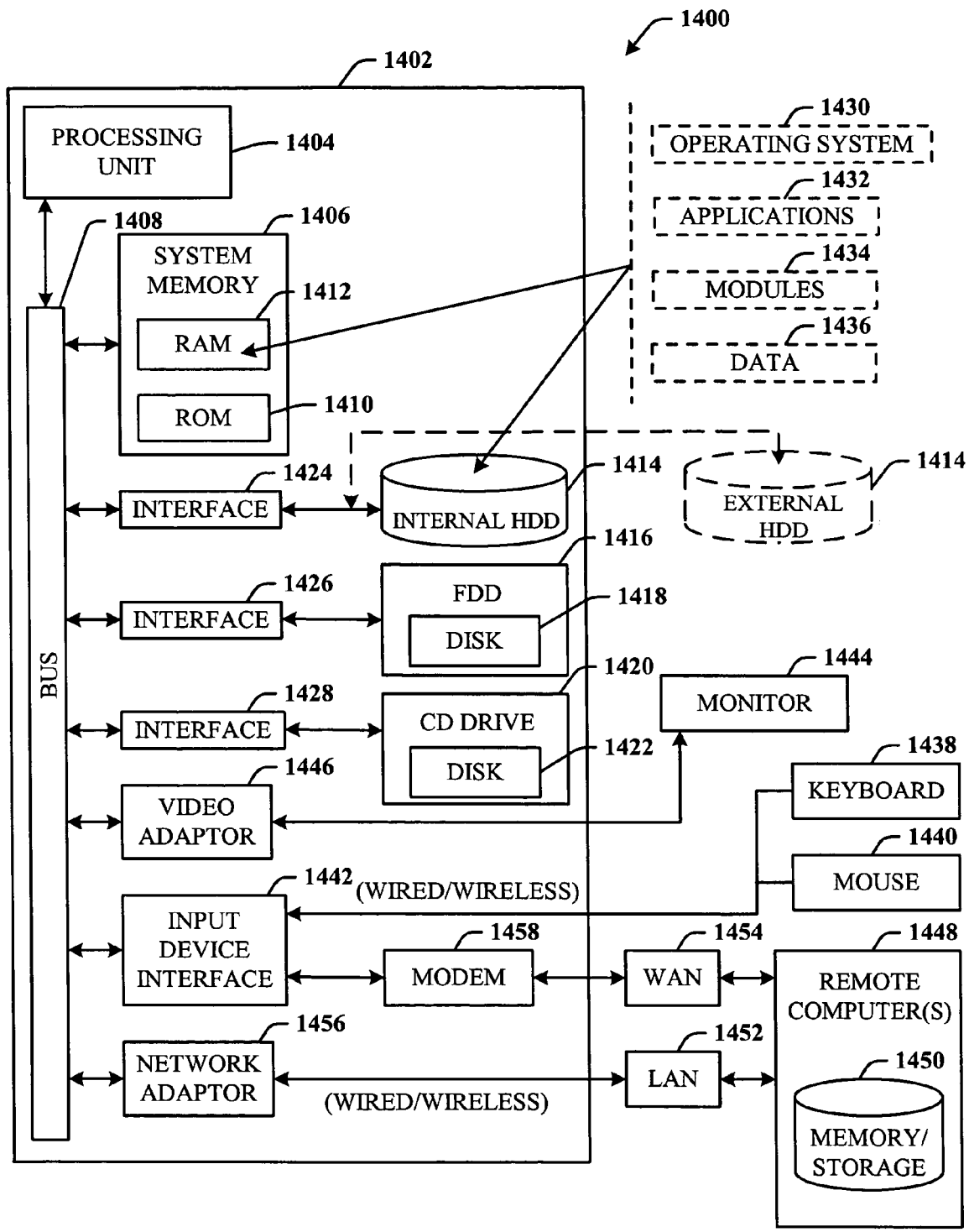
FIGS. 14 and 15 are illustrations of exemplary computing environments 1400 and 1500 in accordance with aspects of the present invention.

Referring now to FIG. 14, there is illustrated a block diagram of a computer operable to execute the disclosed architecture. In order to provide additional context for various aspects of the present invention, FIG. 14 and the following discussion are intended to provide a brief, general description of a suitable computing environment 1400 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 14, there is illustrated an exemplary environment 1400 for implementing various aspects of the invention comprises a computer 1402, the computer 1402 comprising a processing unit 1404, a system memory 1406 and a system bus 1408. The system bus 1408 couples system components comprising, but not limited to, the system memory 1406 to the processing unit 1404. The processing unit 1404 may be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 comprises read only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up.

The computer 1402 further comprises a hard disk drive 1414, a magnetic disk drive 1416, (e.g., to read from or write to a removable disk 1418) and an optical disk drive 1420, (e.g., reading a CD-ROM disk 1422 or to read from or write to other high capacity optical media such as Digital Video Disk (DVD)). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The drives and their associated computer-readable media provide nonvolatile storage of data, data structures, computer-executable instructions, and so forth. For the computer 1402, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1412, comprising an operating system 1430, one or more application programs 1432, other program modules 1434 and program data 1436. It is appreciated that the present invention can be implemented with various commercially available operating systems or combinations of operating systems.

A user can enter commands and information into the computer 1402 through a keyboard 1438 and a pointing device, such as a mouse 1440. Other input devices (not shown) may comprise a microphone, an IR remote control, a joystick, a game pad, a satellite dish, a scanner, or the like. These and other input devices are often connected to the processing unit 1404 through a serial port interface 1442 that is coupled to the system bus 1408, but may be connected by other interfaces, such as a parallel port, a game port, a universal serial bus ("USB"), an IR interface, etc. A monitor 1444 or other type of display device is also connected to the system bus 1408 via an interface, such as a video adapter 1446. In addition to the monitor 1444, a computer typically comprises other peripheral output devices (not shown), such as speakers, printers etc.

The computer 1402 may operate in a networked environment using logical connections via wired and/or wireless communications to one or more remote computers, such as a remote computer(s) 1448. The remote computer(s) 1448 may be a workstation, a server computer, a router, a personal computer, portable computer, microprocessor-based entertainment appliance, a peer device or other common network node, and typically comprises many or all of the elements described relative to the computer 1402, although, for purposes of brevity, only a memory storage device 1450 is illustrated. The logical connections depicted comprise a local area network (LAN) 1452 and a wide area network (WAN) 1454. Such networking environments are commonplace. in offices, enterprise-wide computer networks, intranets and the Internet.

When used in a LAN networking environment, the computer 1402 is connected to the local network 1452 through a wired or wireless communication network interface or adapter 1456. The adaptor 1456 may facilitate wired or wireless communication to the LAN 1452, which may also comprise a wireless access point disposed thereon for communicating with the wireless adaptor 1456. When used in a WAN networking environment, the computer 1402 typically comprises a modem 1458, or is connected to a communications server on the LAN, or has other means for establishing communications over the WAN 1454, such as the Internet. The modem 1458, which may be internal or external and a wired or wireless device, is connected to the system bus 1408 via the serial port interface 1442. In a networked environment, program modules depicted relative to the computer 1402, or portions thereof, may be stored in the remote memory storage device 1450. It will be appreciated that the network connections shown are exemplary and other means of establishing a communications link between the computers may be used.

The computer 1402 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This comprises at least Wi-Fi and Bluetooth™ wireless technologies. Thus the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

The disclosed computer 1402 may also be employed with HiperLAN technology. HiperLAN is a set of wireless local area network (WLAN) communication standards primarily used in European countries. There are two specifications: HiperLAN/1 and HiperLAN/2, both of which have been adopted by the European Telecommunications Standards Institute. The HiperLAN standards provide features and capabilities similar to those of the IEEE 802.11 WLAN standards used in the U.S. and other adopting countries. HiperLAN/1 provides communications at up to 20 Mbps in the 5-GHz range of the radio frequency spectrum. HiperLAN/2 operates at up to 54 Mbps in the same RF band, and is compatible with 3G (third-generation) WLAN systems for sending and receiving data, images, and voice communications. HiperLAN/2 has the potential, and is intended, for implementation worldwide in conjunction with similar systems in the 5-GHz RF band.

Figure 15:
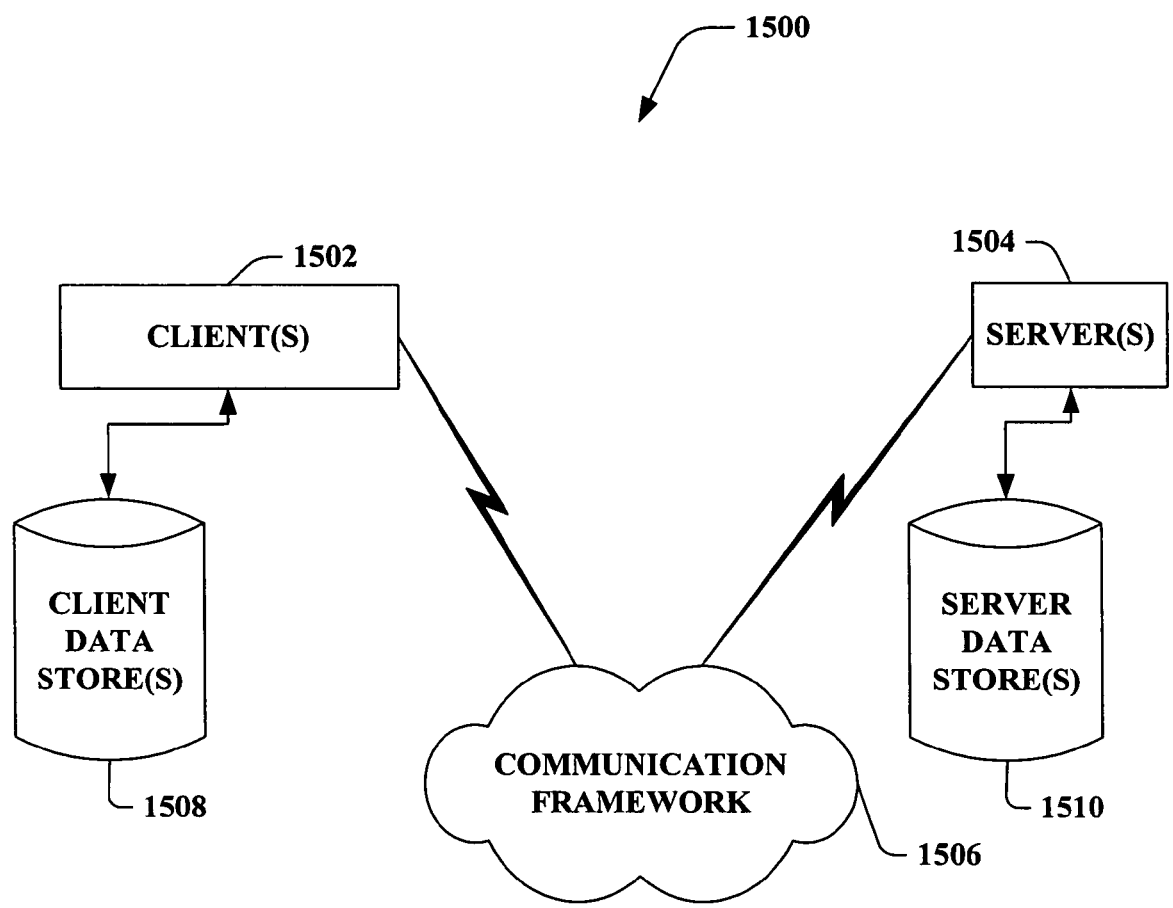

Referring now to FIG. 15, there is illustrated a schematic block diagram of an exemplary computing environment 1500 in accordance with the present invention. The system 1500 comprises one or more client(s) 1502. The client(s) 1502 can be hardware and/or software (e.g., threads, processes, computing devices). The client(s) 1502 can house cookie(s) and/or associated contextual information by employing the present invention, for example. The system 1500 also comprises one or more server(s) 1504. The server(s) 1504 can also be hardware and/or software (e.g., threads, processes, computing devices). The servers 1504 can house threads to perform transformations by employing the present invention, for example. One possible communication between a client 1502 and a server 1504 may be in the form of a data packet adapted to be transmitted between two or more computer processes. The data packet may comprise a cookie and/or associated contextual information, for example. The system 1500 comprises a communication framework 1506 (e.g., a global communication network such as the Internet) that can be employed to facilitate communications between the client(s) 1502 and the server(s) 1504.

Communications may be facilitated via a wired (comprising optical fiber) and/or wireless technology. The client(s) 1502 are operably connected to one or more client data store(s) 1508 that can be employed to store information local to the client(s) 1502 (e.g., cookie(s) and/or associated contextual information). Similarly, the server(s) 1504 are operably connected to one or more server data store(s) 1510 that can be employed to store information local to the servers 1504.

What has been described above comprises examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates real-time information exchange between users in a conference environment, comprising:
    at least two Data Clients that received conference-related information and present it to respective users, each Date Client comprising a user interface with a Presentation Chute icon therein, wherein, at least one Data Client of the at least two Data Clients comprises a receiving Data Client; and
    a Room Server comprising a Data Server that communicates with each of the at least two Data Clients and permit data transfer over at least on real-time communication channel;
    wherein:
        the Presentation Chute icon permits a user of a sending Data Client to drag-and-drop a file over the Presentation Chute icon to immediately upload the file to the Data Server, from which the Data Server facilitates presentation of the file to each particular receiving Data Client based on the viewer capabilities of each particular receiving Data Client such that, based on the file format, each particular receiving Data Client will launch an appropriate Data Viewer; and
        the Presentation Chute enables sharing an imaged, non-editable version of the file over which the user retains control with each particular receiving Data Client; and wherein the Data Server determines viewer capabilities of each particular receiving Data Client and formats a respective file for each particular receiving Data Client for a respective viewer based upon the viewer capabilities of each particular receiving Data Client.

2. The system of claim 1, at least one Data Client is located locally to the Room Server and at least one Data Client is located remotely from the Room Server.

3. The system of claim 2, the conference environment comprises at least one remote person Stand-in Device that represents a remote user and an audio/video (AV) client that provides audio and video communication information to the at least one remote user represented by the at least one remote person Stand-in Device.

4. The system of claim 3, the at least one remotely located Data Client is run on a remote personal computer that comprises a microphone and a web camera.

5. The system of claim 4, the remote personal computer comprises an AV Client that coordinates audio and video information in a remote location.

6. The system of claim 2, at least one of the at least two Data Clients runs on at least one of a personal computer, a laptop, a tablet, a handheld computing device, a personal desktop assistant, or a cell phone.

7. The system of claim 6, further comprising a video component that captures still images and/or video in the local location and provides the captured data to the AV Client in the local location for dissemination to one or more AV Clients located at one or more remote locations.

8. The system of claim 7, the video component comprises a digital camera that captures wide-angle video of users present at a conference room table.

9. The system of claim 8, further comprising a Virtual Director that controls the digital camera.

10. The system of claim 8, the video component further comprises a web camera that captures high-resolution images of documents for real-time dissemination.

11. The system of claim 6, further comprising an audio component that captures audio information in a conference room and provides the captured data to the AV Client in the conference room for dissemination to one or more AV Clients in one or more remote locations.

12. The system of claim 11, further comprising a Virtual Director that exerts control over and/or makes inferences regarding the audio component.

13. The system of claim 11, the audio component reduces ambient noise in the conference room.

14. The system of claim 11, the audio component provides echo mitigation in the conference room.

15. The system of claim 11, the audio component comprises a microphone array that facilitates at least one of audio data capture, noise reduction, or automatic echo mitigation.

16. The system of claim 15, the audio component determines speaker position in the conference room.

17. The system of claim 1, the user interface further comprises a first region comprising server file icons and a second region comprising local file icons.

18. The system of claim 1, the file is an electronic slide presentation.

19. A system that facilitates real-time multimedia information exchange in a conference environment, comprising:
- a Room Server located in a conference room;
- one or more local Data Clients that run on personal computing devices to facilitate data collaboration, located in the conference room;
- one or more remote Data Clients that run on one or more remote personal computing devices in at least one disparate location from the conference room; and
- zero or more audio/video (AV) clients that run at one or more of the conference room or at least one disparate location;
- at least one local Data Client or at least one remote Data Clients comprising a recipient Data Client:
- the one or more local Data Clients and the one or more remote Data Clients each including a respective user interface, each respective user interface including a Presentation Chute icon wherein:
  - the Presentation Chute icon permits a user of a sending Data Client to drag-and-drop a file over the Presentation Chute icon to immediately unload the file to the Data Server, from which the Data Server facilitates presentation of the file to each particular recipient Data Client based on the viewer capabilities of each particular recipient Data Client such that, based on the file format, each particular Data Client launches an appropriate Data Viewer; and
  - the Presentation Chute enables sharing an imaged, non-editable version of the file over which the user retains control with each particular receiving Data Client;
- the Room Server comprising a Data Server that:
  - communicates with each of the at least one local Data Client, the at least one remote Data Clients, and the AV client;
  - facilitates data transfer over at least one real-time communication channel;
  - determines viewer capabilities of each-particular recipient Data Client; and
  - formats a file for each-particular receiving Data Client for a respective viewer based upon the viewer capabilities of each-particular recipient Data Client.

20. The system of claim 19, the one or more remote personal computing device comprises a personal computer equipped with a microphone, a web camera, and an AV Client.

21. The system of claim 19, the one or more remote personal computing device comprises a cellular phone.

22. The system of claim 19, further comprising a remote Stand-in Device connected to the Room Server that permits a remote user to receive real-time audio and video data from the conference room and to be seen in the conference room by users in the conference room.

23. The system of claim 22, the remote Stand-in Device comprises a flat-panel display, a digital automatic pan/tilt/zoom (DPTZ) camera, a microphone array, and at least one speaker.

24. The system of claim 23, the remote user controls the DPTZ camera to pan, tilt, and/or zoom to specific regions of a digital image captured by the DPTZ camera.

25. The system of claim 24, the DPZT camera is controlled by a Virtual Director to automatically pan, tilt, and/or zoom to a speaking person in the conference room based at least in part on at least one of:
- position information gleaned from the microphone array regarding the location of the speaking person within the conference room; or
- vision-based tracking information gleaned from video captured by the DPTZ camera.

26. The system of claim 25, the vision-based tracking information is based on at least one of motion of a speaker, appearance of a speaker, or particle filter-based analysis.

27. The system of claim 25, the Virtual Director presents a localized region of a digital video image in which a speaking person is located in higher resolution than the rest of the digital video image.

28. The system of claim 19, the conference environment comprises at least one of a plurality of conference rooms or a plurality of remote locations, each of which comprises at least one Data Client or one AV Client.

29. The system of claim 28, each of the plurality of conference rooms and the plurality of remote locations comprises an AV Client.

30. A system that facilitates real-time multimedia information exchange in a conference room, comprising:
- a Room Server that resides on a Room Server PC and provides centralized control of information exchange, the room server comprising a Data Server that communicates with the one or more Data Clients;
- a local audio/video (AV) client that controls AV communication and resides in the Room Server PC; and
- one or more Data Clients connected to the Room Server, the one or more Data Clients being separate and distinct from the AV Client, the one or more Data Clients each include a user interface and each of the user interfaces include a Presentation Chute icon, wherein, at least one Data Client comprises a receiving Data Client, the one or more receiving Data Clients being permitted to view the document asynchronously where each of the one or more receiving Data Clients are allowed to skip ahead or revert backwards within the document from a view occupied by the sending Data Client, each of the user interfaces further include a Sync icon that automatically synchronizes the document to the view occupied by the sending Data Client when selected wherein:
  - the Presentation Chute icon permits a user of a sending Data Client to drag-and-drop a file over the Presentation Chute icon to immediately unload the file to the Data Server, from which the Data Server facilitates presentation of the file to each particular receiving Data Client based on the viewer capabilities of each particular receiving Data Client such that, based on the file format, each particular receiving Data Client will launch an appropriate Data Viewer; and
  - the Presentation Chute enables sharing an imaged, non-editable version of the file over which the user retains control with each particular receiving Data Client; and
- the Data Server determines viewer capabilities of each-particular receiving Data Client and formats a file for each-particular receiving Data Client for a respective viewer based upon the viewer capabilities of each particular receiving Data Client.

31. The system of claim 30, the Room Server comprises an AV Server coupled to the local AV Client and zero or more remote AV Clients.

32. The system of claim 30, further comprising a remote Stand-in Device that represents one or more remote users.

33. The system of claim 32, the remote Stand-in Device comprises a monitor, a wide-angle web camera that captures video of the conference room, a microphone array that captures audio in the conference room, and at least one speaker.

34. The system of claim 33, further comprising a web camera that captures high-resolution images and/or video of documents.

35. A system that facilitates real-time multimedia information exchange, comprising:
- means for capturing audio/video information in at least one of a first location or a second location remote from the first location;
- means for presenting captured audio/video information to at least two users, each user is located in at least one of the first or second locations;
- means for permitting data collaboration between the at least two users;
- means for providing a communications link between the at least two users;
- means for permitting real-time document transfer from a first user to at least a second user, the means for permitting comprising a Presentation Chute icon permitting the first user to drag-and-drop a file over the Presentation Chute icon to immediately upload the file to a Data Server, the Presentation Chute icon comprising a means enabling sharing an imaged, non-editable version of the real-time document over which the first user retains control with the device employed by the second user while the first user retains control of the imaged, non-editable version of the real-time document;
- means for determining capabilities associated with a device employed by the second users, the means for determining comprising the Data Server, which facilitates presentation of the file to the device employed by the second user based on the viewer capabilities of the device employed by the second user;
- means for formatting the real-time document based upon the determined capabilities of the device when communicating the real-time document to the second user, the means for formatting operating such that, based at least on the file format, the device employed by the second user will launch an appropriate Data Viewer; and
- means for synchronizing a view of the real-time document employed by the second user to a view of the real-time document employed by the first user based upon input from the second user subsequent to permitting desynchronous review of the real-time document by the second user.

36. The system of claim 35, further comprising:
- means for permitting real-time document transfer in binary format from the first user to the second user; and
- means for recognizing a transferred document as a specified type of document and presenting it to a recipient user according to the specified type.

37. The system of claim 35, further comprising means for inviting a user to participate in a conference.

38. A method for real-time information exchange in a multimedia conferencing environment, comprising:
- providing a Data Client that permits data collaboration;
- providing an AV Client that permits AV communication, the AV Client and the Data Client operate independently of each other;
- presenting a user interface to a sending user with the Data Client, the user interface comprises a Presentation Chute icon wherein:
  - the Presentation Chute icon permits a user of the Data Client to drag-and-drop a file over the Presentation Chute icon to immediately upload the file to a Data Server, from which the Data Server facilitates presentation of the file to at least one receiving Data Client based on the viewer capabilities of a particular receiving Data Client such that, based on the file format, the particular receiving Data Client launches an appropriate Data Viewer; and
  - the Presentation Chute enables sharing an imaged, non-editable version of the file over which the user retains control including at the particular receiving Data Client;
- receiving a real-time file dragged-and-dropped upon the Presentation Chute icon by the sending user employing the Data Client;
- uploading the real-time file to the Data Server, wherein the Data Server determines viewer capabilities of a disparate, recipient Data Client and formats the real-time file for the disparate, recipient Data Client for a respective viewer based upon the viewer capabilities of the disparate, recipient Data Client;
- transmitting the real-time file to the disparate, recipient Data Client from the Data Server;
- facilitating shared control such that:
  - in an event that the user has relinquished control of the real-time file:
    - permitting desynchronization of the real-time file to enable a receiving user utilizing the disparate, recipient Data Client to scroll through the real-time file at a differing pace from a pace employed by the sending user, and
    - allowing the receiving user utilizing the disparate, recipient Data Client to synchronize the real-time file to a view employed by the sending user based upon input from the receiving user;
  - in an event that the user has not relinquished control of the real-time file:
    - not permitting desynchronization of the real-time file to enable the receiving user utilizing the disparate, recipient Data Client to scroll through the real-time file at a differing pace from a pace employed by the sending user.

* * * * *